United States Patent
Araki et al.

(10) Patent No.: US 8,363,759 B2
(45) Date of Patent: Jan. 29, 2013

(54) RECEIVER, METHOD OF RECEPTION, RECEPTION PROGRAM, INTEGRATED CIRCUIT, AND DIGITAL TELEVISION

(75) Inventors: Mariko Araki, Osaka (JP); Tomohiro Kimura, Osaka (JP)

(73) Assignee: Panasonic Corporation, Osaka (JP)

( * ) Notice: Subject to any disclaimer, the term of this patent is extended or adjusted under 35 U.S.C. 154(b) by 569 days.

(21) Appl. No.: 12/600,706

(22) PCT Filed: Mar. 31, 2009

(86) PCT No.: PCT/JP2009/001498
§ 371 (c)(1),
(2), (4) Date: Nov. 30, 2009

(87) PCT Pub. No.: WO2009/122727
PCT Pub. Date: Oct. 8, 2009

(65) Prior Publication Data
US 2010/0142664 A1   Jun. 10, 2010

(30) Foreign Application Priority Data
Mar. 31, 2008 (JP) ................................ 2008-091086

(51) Int. Cl.
*H03D 1/04* (2006.01)
(52) U.S. Cl. .......................................................... 375/346
(58) Field of Classification Search .................. 375/259, 375/260, 285, 316, 343, 355, 346; 370/203, 370/208, 210
See application file for complete search history.

(56) References Cited

U.S. PATENT DOCUMENTS

| | | | | |
|---|---|---|---|---|
| 6,650,617 B1* | 11/2003 | Belotserkovsky et al. | ... | 370/210 |
| 6,771,591 B1* | 8/2004 | Belotserkovsky et al. | ... | 370/210 |
| 7,633,924 B2* | 12/2009 | Fujii et al. | ..... | 370/343 |
| 7,693,035 B2* | 4/2010 | Hasegawa et al. | ......... | 370/208 |
| 7,701,841 B2* | 4/2010 | Kawauchi et al. | ......... | 370/210 |
| 7,769,095 B2* | 8/2010 | Wenzhen et al. | ........... | 375/260 |
| 7,817,738 B2* | 10/2010 | Takeuchi et al. | ........... | 375/260 |
| 2004/0105512 A1* | 6/2004 | Priotti | ........................ | 375/340 |

(Continued)

FOREIGN PATENT DOCUMENTS

| | | |
|---|---|---|
| EP | 1 330 087 | 7/2003 |
| JP | 2004-179816 | 6/2004 |
| JP | 2004-336279 | 11/2004 |
| JP | 2006-229323 | 8/2006 |
| JP | 2008-42575 | 2/2008 |
| WO | 00/29959 | 5/2000 |

OTHER PUBLICATIONS

English translation of Nakahara, H. et al., *A Study on Symbol Timing Synchronization for OFDM signals*, Proceeding of the 1999 communications Society conference of IEICE, P374, B-5-139 (Aug. 16, 1999). International Search Report issued Apr. 28, 2009 in International (PCT) Application No. PCT/JP2009/001498.
Nakahara, H. et al., *A Study on Symbol Timing Synchronization for OFDM signals*, Proceeding of the 1999 communications Society conference of IEICE, P374, B-5-139 (Aug. 16, 1999).

*Primary Examiner* — Tesfaldet Bocure
(74) *Attorney, Agent, or Firm* — Wenderoth, Lind & Ponack, L.L.P.

(57) ABSTRACT

A receiver which allows suitable setting of the position of an FFT (Fast Fourier Transform) window (execution timing) when executing FFT to demodulate an OFDM (Orthogonal Frequency Division Multiplex) signal. The receiver estimates the transmission path property of a received OFDM signal and estimates an ISI (Inter Symbol Interference) amount in each case of a plurality of FFT window position candidates from the estimated transmission path property. An FFT window position candidate wherein the ISI amount is estimated to be the smallest among the FFT window position candidates is set as an actual FFT window position, and executes Fourier transformation.

13 Claims, 18 Drawing Sheets

U.S. PATENT DOCUMENTS

| | | | |
|---|---|---|---|
| 2004/0228272 A1* | 11/2004 | Hasegawa et al. | 370/210 |
| 2005/0163258 A1* | 7/2005 | Gore et al. | 375/340 |
| 2006/0176802 A1* | 8/2006 | Ko et al. | 370/208 |
| 2006/0239367 A1* | 10/2006 | Wilhelmsson et al. | 375/260 |
| 2006/0245349 A1* | 11/2006 | Vrcelj et al. | 370/210 |
| 2007/0036231 A1 | 2/2007 | Ido | |
| 2007/0070882 A1* | 3/2007 | Kawauchi et al. | 370/210 |
| 2008/0025417 A1* | 1/2008 | Zhidkov et al. | 375/260 |
| 2008/0069252 A1* | 3/2008 | Wenzhen et al. | 375/260 |
| 2008/0198942 A1* | 8/2008 | Akella et al. | 375/260 |
| 2009/0274038 A1* | 11/2009 | Takeuchi et al. | 370/210 |
| 2010/0128806 A1* | 5/2010 | Francalanci et al. | 375/260 |

* cited by examiner

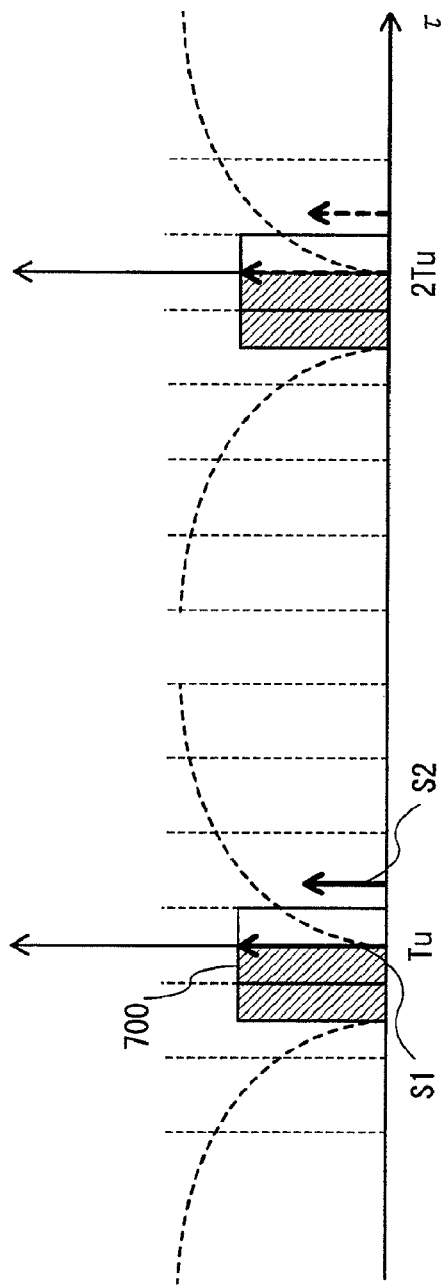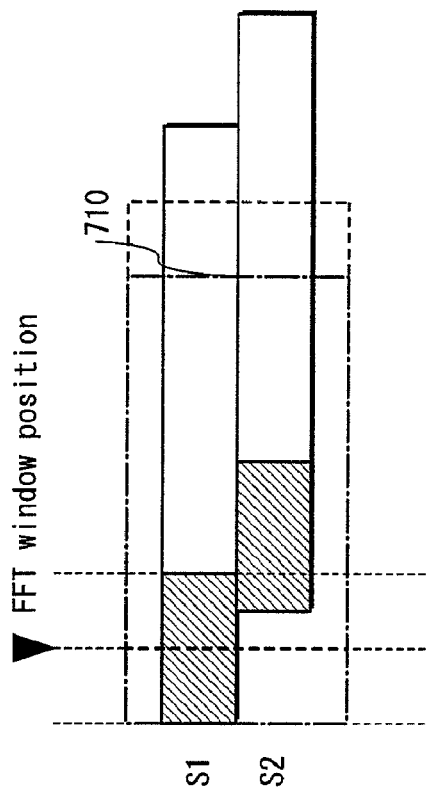

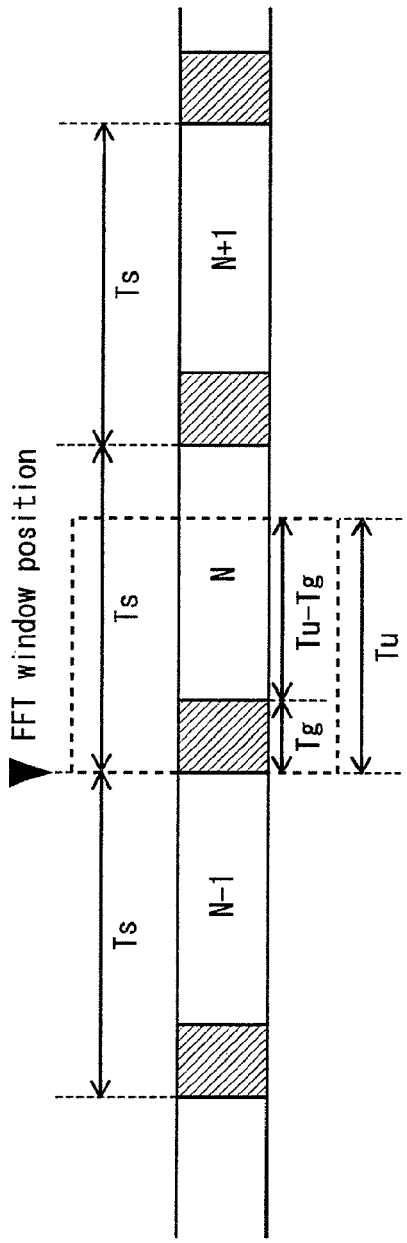
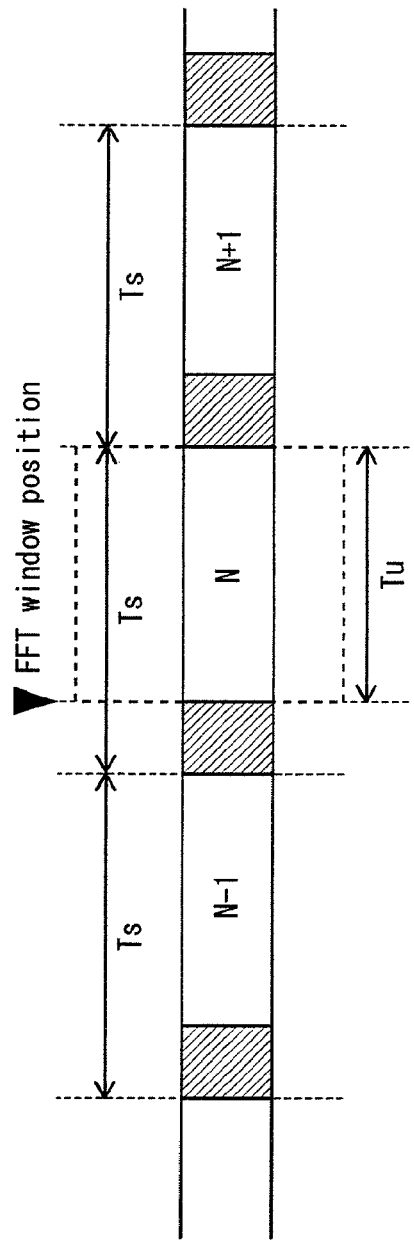
FIG. 16A PRIOR ART
FIG. 16B PRIOR ART

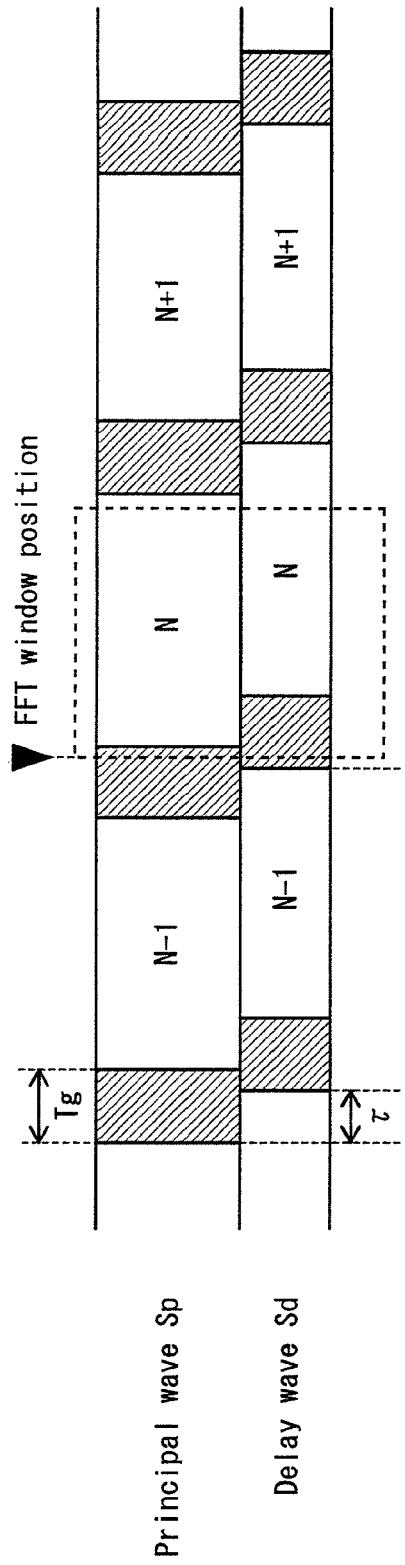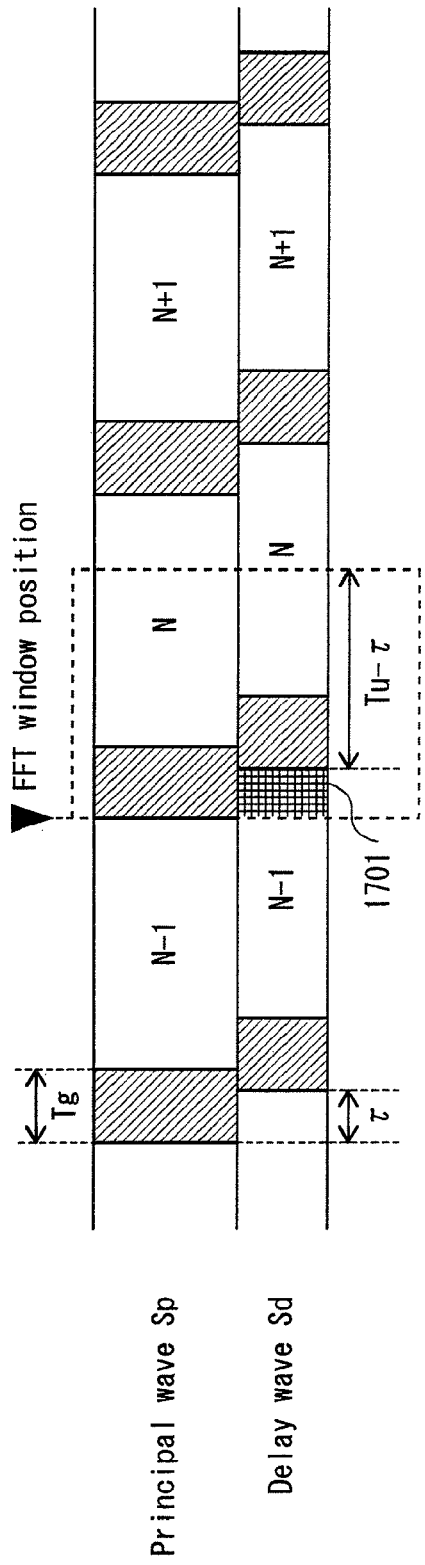

RECEIVER, METHOD OF RECEPTION, RECEPTION PROGRAM, INTEGRATED CIRCUIT, AND DIGITAL TELEVISION

TECHNICAL FIELD

The present invention relates to a reception device and a reception method for setting an appropriate FFT (Fast Fourier Transform) window position in accordance with various conditions of a channel when receiving an OFDM (Orthogonal Frequency Division Multiplex) signal.

BACKGROUND ART

A so-called OFDM method has been adopted as a transmission method for a wireless LAN and digital terrestrial broadcasting. The OFDM method is highly efficient in use of frequency since the method enables a plurality of digitally modulated carriers (subcarriers) to be densely arranged while maintaining orthogonality thereof. Also, the OFDM method has a feature of preventing Inter-Symbol Interference (hereinafter, "ISI") caused by a delay wave transmitted in a multipath channel, by setting guard intervals (hereinafter, "GI").

The following describes modulation processing in the OFDM method that is performed on a transmission side. A transmission device generates an OFDM signal in a frequency domain in the following manner. First, the transmission device performs complex modulation on transmission data for each predetermined number of bits so as to obtain in-phase components and quadrature components. Then, the transmission device assigns each pair of the in-phase components and quadrature components to the respective subcarriers, and multiplexes the subcarriers. The transmission device generates an OFDM signal in a time domain by performing Inverse Fast Fourier Transform (hereinafter, "IFFT") on the OFDM signal in the frequency domain. The transmission device provides GIs for the OFDM signal in the time domain, converts the frequency of the OFDM signal into Radio Frequency band (hereinafter, "RF band"), and transmits the OFDM signal at the radio frequency.

FIG. 15A shows a signal obtained by generating the OFDM signal in the time domain with use of the IFFT and providing a GI for the OFDM signal. In FIG. 15A, a useful symbol 1502 refers to the OFDM signal in the time domain that is generated by the IFFT, a GI 1501 refers to a signal provided as GI, and an OFDM symbol 1503 is a signal composed of the useful symbol 1502 and the GI 1501. A useful symbol period Tu is the duration of the OFDM signal in the time domain that is generated by the IFFT, a GI period Tg is the duration of the GI, and a symbol period Ts is the duration of one symbol of the OFDM signal that is transmitted. It is assumed here that Ts=Tg+Tu. The GI 1501 is provided by copying, to the frontward part of the OFDM signal in the time domain generated by the IFFT, the backward part of the OFDM signal having a length worth the GI period Tg in the time domain generated by the IFFT. The GI 1501 attached to the frontward part of the useful symbol 1502 in the above-described manner is also referred to as "Cyclic Prefix (CP)".

FIG. 15B shows the OFDM signal transmitted from the transmission device. As shown in FIG. 15B, the transmission device sequentially transmits, as the OFDM signal, a plurality of OFDM symbols generated as shown in FIG. 15A.

The following describes demodulation processing in the OFDM method that is performed on a reception side. The reception device performs the demodulation processing by performing on a received signal an opposite process from that of the transmission device. The reception device generates the OFDM signal in the baseband in the time domain, from the received signal. Then, the reception device converts the OFDM signal in the time domain into the OFDM signal in the frequency domain, by performing Fast Fourier Transform (FFT) on the OFDM signal in the time domain on a symbol-by-symbol basis. The reception device plays back transmission data by demodulating, in units of subcarriers, the OFDM signal in the frequency domain.

In the FFT processing performed on the OFDM signal in the time domain, a time window (hereinafter, "FFT window") having the duration of the useful symbol period Tu is set, and the FFT processing is performed on the OFDM signal in the time domain in the time window. At this time, it is necessary to appropriately set the time position (hereinafter, "FFT window position") of the FFT window. Otherwise, Inter Career Interference (hereinafter, "ICI") in the same symbol and ISI from adjacent symbols occur.

FIGS. 16A and 16B are each a schematic diagram showing an example of the FFT window set for the received OFDM signal. In the following explanation, the FFT window position is designated by the forefront (shown by black triangles in FIGS. 16A and 16B) of the FFT window. The FFT window is shown by a region surrounded by a dotted line in each of FIGS. 16A and 16B, and has a predetermined period (useful symbol period Tu) starting from the FFT window position.

As shown in FIG. 16A, when the FFT window position is set at the start of a GI period, the FFT processing is performed on a part of the OFDM signal corresponding to a period including (i) the entire GI period and (ii) a period from the start of the useful symbol to Tu—Tg. Also, as shown in FIG. 16B, when the FFT window position is set at the start of the useful symbol, the FFT processing is performed on a part of the OFDM signal corresponding to the entire useful symbol period.

The following describes how ICI and ISI occur during the demodulation process of the OFDM signal in which the FFT is performed in the above-described manner, with reference to FIGS. 17A and 17B and 18.

FIGS. 17A, 17B, and 18 each schematically show the OFDM signal received by the reception device, where the horizontal axis represents time. As shown in FIGS. 17A, 17B, and 18, the received OFDM signal includes a principal wave Sp and a delay wave Sd that is delayed by delay time τ from the principal wave due to multipath transmission. The received OFDM signal includes a plurality of consecutive symbols. The following describes the case of demodulating the $N^{th}$ symbol.

FIGS. 17A and 17B each show an example where the delay time τ is shorter than or equal to the GI period Tg. In FIG. 17A, the FFT window position is set to coincide with the GI periods of the principal wave Sp and the delay wave Sd. In FIG. 17B, the FFT window position is set at the start of the GI period of the principal wave Sp.

As described above, when an incoming time difference between the principal wave Sp and the delay wave Sd is shorter than or equal to the GI period Tg, and the FFT window position is set as shown in FIG. 17A, the FFT window only includes the $N^{th}$ symbol of the principal wave Sp and the $N^{th}$ symbol of the delay wave Sd, and not the other symbols of the OFDM signal. As a result, ICI and ISI do not occur.

On the other hand, although an incoming time difference between the principal wave Sp and the delay wave Sd is shorter than or equal to the GI period Tg, when the FFT window position is set as shown in FIG. 17B, ICI and ISI occur. This is because an $N-1^{th}$ symbol signal 1701 (shown by a lattice pattern in FIG. 17B) of the delay wave Sd is included in the FFT window used for the demodulation of the $N^{th}$ symbol. Also, when the FFT window position is set as shown in FIG. 17B, the duration of the component of the $N^{th}$ signal of the delay wave Sd becomes shorter than the duration Tu. As a result, orthogonality is lost between a plurality of carriers that constitute the OFDM transmission signal, causing ICI to occur.

Also, when an incoming time difference τ between the principal wave Sp and the delay wave Sd is larger than the GI period Tg as shown in FIG. 18, ICI and ISI occur regardless of where the FFT window position is set. For example, when the FFT window position is set as shown in FIG. 18, an $N-1^{th}$ symbol signal 1801 of the delay wave Sd is included. When an incoming time difference τ between the principal wave Sp and the delay wave Sd is larger than the GI period Tg as shown in FIG. 18, the effect of ICI and ISI cannot be excluded thoroughly by changing the setting of the FFT window position. However, in order to accurately demodulate the received OFDM signal, it is very important to set the FFT window position in a manner that minimizes the occurrence of ICI and ISI.

Patent Documents 1 and 2 each disclose a technique for setting the FFT window position.

Patent Document 1 discloses a reception device having a functional structure as shown in FIG. 11. As shown in FIG. 11, in the reception device, a Fourier transform unit 1101 performs Fourier transform on a received signal, a pilot extraction unit 1103 extracts a pilot signal from the received signal on which the Fourier transform has been performed, and a first division unit 1105 divides the extracted pilot signal with use of a known signal generated by a known signal generation unit 1104 and obtains channel characteristics in the position of the pilot signal. A first delay profile estimation unit 1107 obtains a delay profile from the channel characteristics obtained by the first division unit 1105. A first timing synchronization unit 1102 determines the FFT window position based on the value of the delay profile estimated by the first delay profile estimation unit 1107, and sets the FFT window position for the Fourier transform unit 1101. At this time, the first timing synchronization unit 1102 determines, as incoming waves, the amplitude of the delay profile or components of the delay profile in which the square value of the amplitude is greater than a predetermined threshold value. Then, the first timing synchronization unit 1102 sets the FFT window position based on the incoming time of the most preceding wave among the incoming waves. The reception device of Patent Document 1 appropriately sets the FFT window position in accordance with the incoming time of the most preceding wave. In this way, when a spread in time (i.e., delay spread) of the incoming waves is smaller than or equal to the GI length, the reception device of Patent Document 1 can prevent the occurrence of ICI and ISI.

Patent Document 2 discloses another method for setting the FFT window position. As shown in FIG. 12, in a reception device in Patent Document 2, an FFT circuit 1203 acquires a signal in a useful symbol period from the OFDM signal in the baseband input from a selector 1202, with use of an FFT time window signal input from a window position control unit 1205. Then, the FFT circuit 1203 performs the FFT computation on the acquired signal. The data of a result of the FFT computation performed by the FFT circuit 1203 is equalized by an equalization circuit 1241 in a data demodulation unit 1204. The equalized data is then demodulated by a demodulation circuit 1242 and performed error correction processing by an error correction circuit 1243, and is output as demodulated data. At this time, an S/N calculation circuit 1244 calculates S/N (Signal to Noise ratio) data, with use of the output of the equalization circuit 1241. The calculated S/N data is input into the window position control unit 1205 as reception quality data indicating the reception quality of the received signal. A reception quality judgment circuit 1251 in the window position control unit 1205 compares with a predetermined reference value the value of the reception quality data that has been input. When the value of the reception quality data is greater than or equal to the reference value, it is judged that the reception quality is excellent. When the value of the reception quality data is less than the reference value, it is judged that the reception quality is poor. A time window setting circuit 1252 adjusts the set position of the FFT time window signal of the FFT circuit 1203.

Note that an input switch circuit 1253 instructs the selector 1202 to select, as input, (i) a baseband OFDM signal output from a buffer memory 1206 while the set position of the FFT time window signal is being adjusted and (ii) a baseband OFDM signal output from a quadrature detection circuit 1201 after the set position of the FFT time window signal is determined. A convergence judgment circuit 1254 gives an instruction for newly writing data into the buffer memory 1206, and also gives an instruction for reading the newly written data after the writing of the data has been completed.

Patent Document 1: Japanese Patent No. 3654646

Patent Document 2: Japanese Patent Application Publication No. 2004-336279

The method for setting the FFT window position described in Patent Document 1 is not suitable in a case shown in FIG. 18, namely a case where the delay spread of the incoming waves exceeds the GI length. This means that the electric power of a signal that causes ISI is also included in the FFT window, and the FFT window position is determined based on the incoming time of the most preceding wave, without any reference to the magnitude of the received power of each incoming wave. As a result, the method described in Patent Document 1 cannot select the FFT window position corresponding to the smallest ISI amount, depending on the reception environment.

The following explains in detail the problem that arises in the method for setting the FFT window position described in Patent Document 1, with reference to FIGS. 13A, 13B, 14A, and 14B. FIGS. 13A and 14A each show the delay profile of a three-wave multipath channel. FIG. 13B and FIG. 14B schematically show transmission symbols of the OFDM signal corresponding to FIG. 13A and transmission symbols of the OFDM signal corresponding to FIG. 14A, respectively. In each of FIGS. 13A and 14A, the horizontal axis represents the incoming time of each incoming wave, and the vertical axis represents the received power of each incoming wave. Assumed here is a case of the three-wave multipath. Each of the incoming waves is respectively referred to as an incoming wave S1 (received power: P1), an incoming wave S2 (received power: P2), and an incoming wave S3 (received power: P3), in order of incoming time. Also, based on the incoming time of the incoming wave S1, the incoming time of the incoming wave S2 is assumed to be τ2, the incoming time of the incoming wave S3 is assumed to be τ3. Also, the received power of each incoming wave is assumed to be P2>P3>P1. Here, the duration of the GI period is assumed to be Tg, where τ2<Tg, τ3>Tg, and (τ3−τ2)<Tg.

As shown in FIG. 13A, when the FFT window position setting method described in Patent Document 1 is used, the FFT window position is set at the start of the useful symbol period of the incoming wave S1 that is the most preceding wave in the delay profile. In this case, the FFT window includes an $N-1^{th}$ symbol signal 1301 of the incoming wave S3, as shown in FIG. 13B. Therefore, ISI occurs due to the $N-1^{th}$ symbol signal 1301.

Meanwhile, assume that the FFT window position is set at the start of the GI period of the incoming wave S3, as shown in FIG. 14A. In this case, by including the incoming wave S3 in the FFT window, an N+1$^{th}$ symbol signal 1401 of the incoming wave S1 is also included in the FFT window, as shown in FIG. 14B. Therefore, ISI occurs due to the N+1$^{th}$ symbol signal 1401. This example is given on the assumption that P3>P1. Therefore, in the conventional FFT window position setting method in Patent Document 1 where the FFT window is set as shown in FIG. 13B, ISI occurs in a greater amount, resulting in the reception quality being deteriorated, compared to when the FFT window is set as shown in FIG. 14B. Such deterioration is caused because the conventional FFT window position setting method in Patent Document 1 is developed in view of merely two points, namely (i) the time position of each incoming wave and (ii) whether the received power of each incoming wave or the amplitude thereof is greater than a predetermined threshold.

In the conventional FFT window position setting method in Patent Document 2, when the window position control unit 1205 in FIG. 12 searches for the optimal FFT window position, the FFT circuit 1203 needs to perform FFT computation every time the time window setting circuit 1252 sets an FFT window position. This causes a great delay in processing, and the window position control unit 1205 fails to search for the optimal FFT window position promptly. Therefore, the conventional method in Patent Document 2 is not suitable in an environment where the phase and amplitude of a fading channel, etc. change constantly.

In the conventional method in Patent Document 2, the FFT window position is set in the following manner. First, the FFT computation is performed in a certain position of a time window, so as to judge whether or not a value indicating the received quality in the position is greater than or equal to a predetermined reference value. When the value is greater than or equal to the reference value, the FFT window position is set in the position of the time window at which the FFT computation has been performed. During the processing of setting the FFT window position, signal data stored in the buffer memory is used. Therefore, if the optimal position of the time window cannot be found in several attempts, the processing of the reception device is delayed until the FFT window position is set. In addition, if it takes longer than a predetermined time period to set the FFT window position, the optimal position is re-searched after writing, into the buffer memory, an OFDM signal in a new baseband. Therefore, if the situation of exceeding the predetermined time period continues, the received quality deteriorates.

Furthermore, in Embodiment 2, Patent Document 2 discloses a reception device that includes an FFT computation circuit used for control, in addition to an FFT computation circuit used for demodulation. In this case, however, the circuit size is increased although a delay in demodulation processing time can be prevented. Also, although an additional component is provided for control, the processing time for setting the FFT window position still needs to be long enough to perform the FFT computation. Therefore, it is difficult to apply the reception device in Patent Document 2 to a channel in which amplitude and phase constantly change.

In view of the above-described problems, an object of the present invention is to provide a reception device that sets an FFT window position promptly and minimizes an ISI amount, compared to conventional techniques.

SUMMARY OF THE INVENTION

In order to solve the above-described problem, the present invention provides a reception device for receiving an OFDM (Orthogonal Frequency Division Multiplexing) signal, comprising: a Fourier transform unit operable to perform Fourier transform on the received OFDM signal on a symbol-by-symbol basis in a designated FFT (Fast Fourier Transform) window position, so as to obtain a transformed signal; a channel characteristic estimation unit operable to estimate channel characteristics based on the transformed signal; and a window position control unit operable to estimate a plurality of ISI (Inter Symbol Interference) amounts based on the channel characteristics, and designate the FFT window position based on the plurality of ISI amounts.

Also, the present invention provides a reception method for receiving an OFDM (Orthogonal Frequency Division Multiplexing) signal, comprising: a Fourier transform step of performing Fourier transform on the received OFDM signal on a symbol-by-symbol basis in a designated FFT (Fast Fourier Transform) window position, so as to obtain a transformed signal; a channel characteristic estimation step of estimating channel characteristics based on the transformed signal; and a window position control step of estimating, based on the channel characteristics, a plurality of ISI (Inter Symbol Interference) amounts that are each an amount of ISI occurring if the FFT window position is shifted, and controlling the FFT window position based on the plurality of ISI amounts.

Furthermore, the present invention provides a reception program causing a computer to perform a process for receiving and demodulating an OFDM (Orthogonal Frequency Division Multiplexing) signal, the process comprising: a Fourier transform step of performing Fourier transform on the received OFDM signal on a symbol-by-symbol basis in a designated FFT (Fast Fourier Transform) window position, so as to obtain a transformed signal; a channel characteristic estimation step of estimating channel characteristics based on the transformed signal; and a window position control step of estimating, based on the channel characteristics, a plurality of ISI (Inter Symbol Interference) amounts that are each an amount of ISI occurring if the FFT window position is shifted, and controlling the FFT window position based on the plurality of ISI amounts.

Also, the present invention provides an integrated circuit for receiving an OFDM (Orthogonal Frequency Division Multiplexing) signal, comprising: a Fourier transform unit operable to perform Fourier transform on the received OFDM signal on a symbol-by-symbol basis in a designated FFT (Fast Fourier Transform) window position, so as to obtain a transformed signal; a channel characteristic estimation unit operable to estimate channel characteristics based on the transformed signal; and a window position control unit operable to estimate a plurality of ISI (Inter Symbol Interference) amounts based on the channel characteristics, and designate the FFT window position based on the plurality of ISI amounts.

Furthermore, the present invention provides a digital television for displaying an image according to a signal obtained by receiving and demodulating an OFDM (Orthogonal Frequency Division Multiplexing) signal, comprising: a Fourier transform unit operable to perform Fourier transform on the received OFDM signal on a symbol-by-symbol basis in a designated FFT (Fast Fourier Transform) window position, so as to obtain a transformed signal; a channel characteristic estimation unit operable to estimate channel characteristics based on the transformed signal; and a window position control unit operable to estimate a plurality of ISI (Inter Symbol Interference) amounts based on the channel characteristics, and designate the FFT window position based on the plurality of ISI amounts.

Here, the FFT window position refers to a timing at which the FFT is performed on the received OFDM signal.

EFFECT OF THE INVENTION

With the stated structure, the ISI amounts are estimated from the channel characteristics, and the FFT window position is appropriately set based on the estimated ISI amounts. Furthermore, the present invention is different from the invention disclosed in Patent Document 2, since the present invention does not perform the FFT computation to determine whether or not the FFT window position is appropriate. Instead, the present invention reduces the amount of ISI and determines the FFT window position more promptly than the conventional techniques on average.

The window position control unit may include: an ISI amount estimation unit operable to estimate, based on the channel characteristics, the plurality of ISI amounts that are each an amount of ISI occurring if the Fourier transform is performed in a corresponding one of FFT window position candidates; and a determination unit operable to determine an FFT window position candidate corresponding to a smallest estimated ISI amount, and designate the FFT window position candidate as the FFT window position.

The ISI amount estimation unit may include: a delay profile calculation unit operable to calculate a delay profile based on the channel characteristics; an evaluation function generation unit operable to generate a plurality of evaluation functions corresponding one-to-one to the plurality of FFT window position candidates; and a multiplication unit operable to estimate the plurality of ISI amounts by multiplying each evaluation function and the delay profile.

With the above-described structure, the ISI amounts are estimated in accordance with the plurality of FFT window position candidates. Therefore, the FFT window position is determined promptly by estimating the ISI amounts, as compared to a conventional technique in which the FFT processing is actually performed on a signal to obtain a transformed signal and then judgment is made as to whether the transformed signal is suitable for a practical use. If the transformed signal is not suitable for a practical use, the FFT window position is changed.

Also, it is possible to arbitrarily increase the number of FFT window position candidates, so as to improve the accuracy (resolution time) with respect to the change of the channel characteristics over time. Even in such a case, the FFT is not actually performed as seen in the conventional technique. Therefore, the processing time is shorter than that of the conventional technique.

The ISI amount estimation unit may include: a filter coefficient estimation unit operable to generate a plurality of filter coefficients corresponding one-to-one to the plurality of FFT window position candidates; and a filter unit operable to estimate the plurality of ISI amounts by filtering the channel characteristics with use of the plurality of filter coefficients.

Also, the ISI amount estimation unit may include: a computation unit operable to rotate a phase of the channel characteristics in accordance with each FFT window position candidate, so as to obtain rotated channel characteristics corresponding one-to-one to the FFT window position candidates; and a filter unit operable to estimate the plurality of ISI amounts by filtering the rotated channel characteristics.

With the stated structure, the FFT window position is appropriately set by estimating the ISI amounts. In this way, the present invention responds promptly to a sudden change of the channel characteristics, and the circuit size is reduced, as compared to the case of setting an appropriate FFT window position by performing the FFT processing.

The window position control unit may include: a window position candidate output unit operable to output a plurality of FFT window position candidates; an ISI amount estimation unit operable to estimate, based on the channel characteristics, the plurality of ISI amounts that are each an amount of ISI occurring if the Fourier transform is performed in a corresponding one of FFT window position candidates; and a specification unit operable to calculate a smallest ISI amount from the plurality of estimated ISI amounts, specify one of the FFT window position candidates that corresponds to the smallest calculated ISI amount, and designate the specified FFT window position as the FFT window position.

With the stated structure, the FFT window position corresponding to the smallest ISI amount is more accurately specified, as compared to the case of selecting one FFT window position candidate from among the plurality of FFT window position candidates.

BRIEF DESCRIPTION OF THE DRAWINGS

FIGS. 7A and 7B each schematically show the second stage of the FFT window position shift;

FIGS. 16A and 16B are each a schematic diagram for explaining a relationship between the OFDM signal and the FFT window position;

FIGS. 17A and 17B each schematically show an ICI/ISI occurrence mechanism when $\tau < Tg$.

Figure 1:
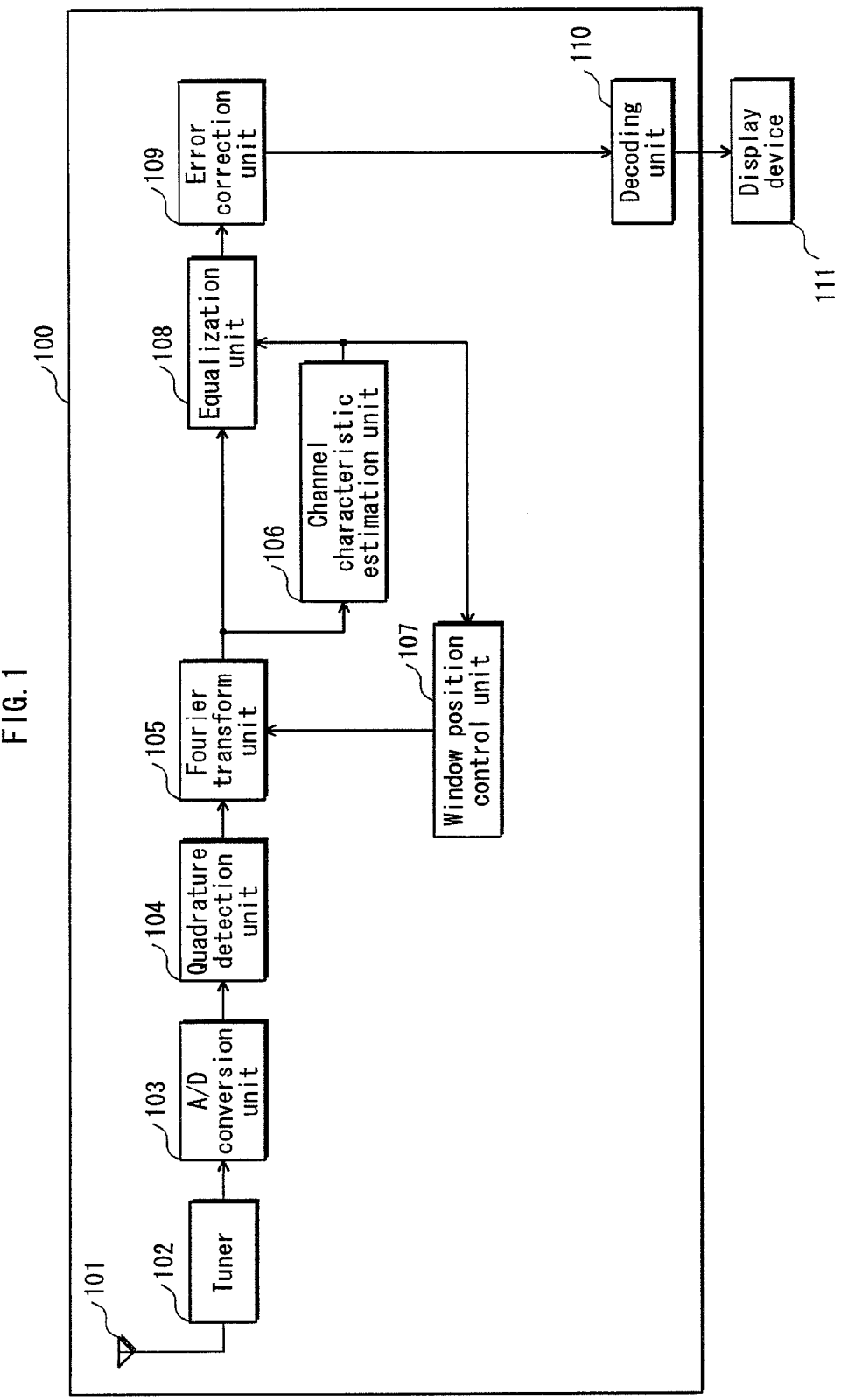
FIG. 1 is a functional block diagram showing a functional structure of a reception device according to the present invention.

DESCRIPTION OF CHARACTERS 100 reception device
101 antenna
102 tuner
103 A/D conversion unit
104 quadrature detection unit
105 Fourier transform unit
106 channel characteristic estimation unit
107 window position control unit
108 equalization unit
109 error correction unit
110 decoding unit
111 display device
201 window position candidate output unit
202, 900, 1000 ISI amount estimation unit
203 judgment unit
301 delay profile calculation unit
302 evaluation function generation unit
303 multiplier
901, 1002 filter
902 filter coefficient generation unit
1001 computation unit
1101 Fourier transform unit
1102 first timing synchronization unit
1103 pilot extraction unit
1104 known signal generation unit
1105 first division unit
1106 interpolation filter unit
1107 first delay profile estimation unit
1108 first delay adjustment unit
1109 second division unit
1110 data playback unit
1201 quadrature detection circuit
1202 selector
1203 FFT circuit
1204 data demodulation unit
1205 window position control unit
1206 buffer memory
1241 equalization circuit
1242 demodulation circuit
1243 error correction circuit
1244 S/N calculation circuit
1251 reception quality judgment circuit
1252 time window setting circuit
1253 input switch circuit
1254 convergence judgment circuit
1255 timer
1256 buffer memory control circuit

DETAILED DESCRIPTION OF THE INVENTION

Embodiment

The following describes a reception device in one embodiment of the present invention, with reference to the drawings.
<Structure>
FIG. 1 is a functional block diagram showing a functional structure of a reception device 100 according to the present invention.

The reception device 100 includes an antenna 101, a tuner 102, an A/D conversion unit 103, a quadrature detection unit 104, a Fourier transform unit 105, a channel characteristic estimation unit 106, a window position control unit 107, an equalization unit 108, an error correction unit 109, and a decoding unit 110. Data decoded by the reception device 100 is displayed by a display device 111 that is a device for displaying images. The display device 111 is realized by an LCD (Liquid Crystal Display), a PDP (Plasma Display Panel), or the like.

The tuner 102 selects a channel set by a user, converts an OFDM signal in an RF band received by the antenna 101 into an OFDM signal in an IF band or a baseband, and transmits the converted OFDM signal to the A/D conversion unit 103.

The A/D conversion unit 103 converts an analog signal transmitted from the tuner 102 into a digital signal, and transmits the digital signal to the quadrature detection unit 104.

The quadrature detection unit 104 performs quadrature detection on the digital signal transmitted from the A/D conversion unit 103, and outputs in-phase axis (I axis) components and quadrature axis (Q axis) components.

The Fourier transform unit 105 performs Fast Fourier Transform (hereinafter "FFT") processing on a signal in a time axis domain output from the quadrature detection unit 104 so as to convert the signal into a signal in a frequency domain, and outputs the signal in the frequency domain. The Fourier transform unit 105 performs the Fourier transform in an FFT window position set by the window position control unit 107. If the FFT window position is not set, the Fourier transform unit 105 performs the Fourier transform in an FFT window position determined with use of a conventional method for determining the FFT window position (e.g., a method in which a position of the GI of a received OFDM signal is specified and the end position of the GI is determined to be the FFT window position). Note that an appropriate FFT window position is determined by the window position control unit 107 in the present invention. Therefore, an initial FFT window position may be set in any position as long as accurate demodulation is not required with respect to the OFDM signal that is initially received.

The channel characteristic estimation unit 106 estimates channel characteristics, with use of a pilot signal that is included in the OFDM signal in the frequency domain and that is transmitted from the Fourier transform unit 103.

The window position control unit 107 estimates an amount of ISI (hereinafter "ISI amount"), with use of the channel characteristics estimated by the channel characteristic estimation unit 106 and notifies the Fourier transform unit 105 of the timing for performing the FFT. The details of the window position control unit 107 is described below.

The equalization unit 108 compensates variations in the amplitude and the phase of the OFDM signal in the frequency domain that is output from the Fourier transform unit 105, based on the channel characteristics estimated by the channel characteristic estimation unit 106.

The error correction unit 109 corrects an error of the signal compensated by the equalization unit 108.

The decoding unit 110 decodes the signal whose error has been corrected by the error correction unit 109. Note here that the signal is coded according to MPEG-2 (Moving Picture Experts Group 2) standard or the like.

Figure 2:
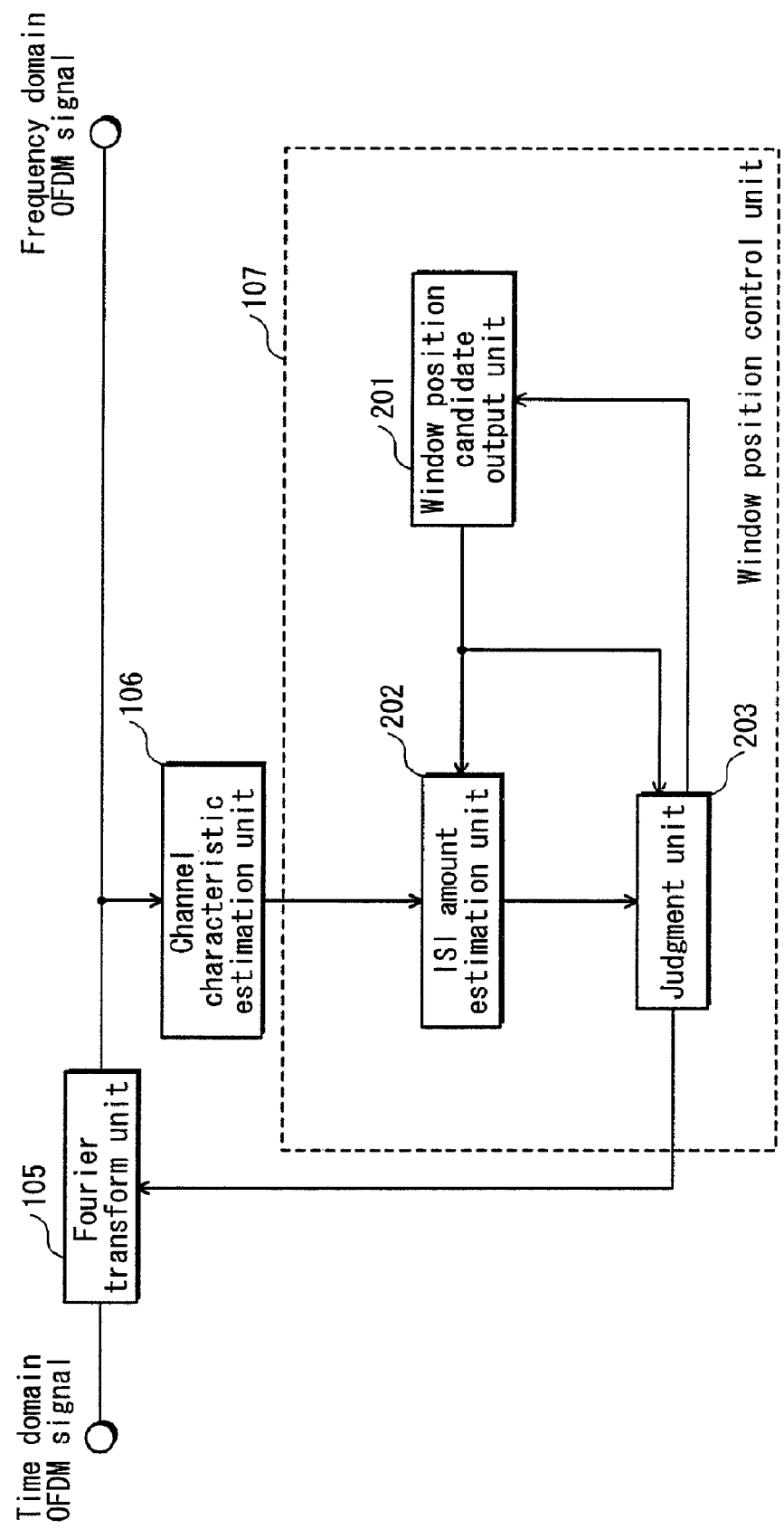
FIG. 2 is a functional block diagram showing the details of a window position control unit according to the present invention.

The following describes the window position control unit 107 in detail, with reference to FIG. 2. FIG. 2 is a functional block diagram showing the details of the window position control unit 107. Note here that FIG. 2 also shows peripheral functional blocks of the window position control unit 107.

As shown in FIG. 2, the window position control unit 107 includes a window position candidate output unit 201, an ISI amount estimation unit 202, and a judgment unit 203.

The window position candidate output unit 201 sets candidates for the time position of an FFT window that is a timing for the Fourier transform unit 105 to perform an FFT computation, and transmits the candidates for the time position to the ISI amount estimation unit 202. The window position candidate output unit 201 transmits, to the ISI amount estimation unit 202, a predetermined number of candidates (hereinafter "FFT window position candidates") for the FFT window position per symbol. Note that each of the above-mentioned FFT window position candidates refers to a candidate shift time s that is a shift amount from a reference position of an FFT window position. The reference position refers to an FFT window position currently set for the Fourier transform unit 105 to perform the FFT. The candidate shift time s is a shift amount from the reference position, and is obtained by increasing a shift amount at a predetermined time interval before and after the reference position. In other words, the window position candidate output unit 201 outputs, for example, $-a, -2a, -3a, \ldots, a, 2a, 3a, \ldots$, as the candidate shift times s, where the time interval is set to be a. The shift amount is shown by a positive value when the FFT window position is shifted in the forward direction along a time axis with respect to the reference position, and shown by a negative value when the FFT window position is shifted in the backward direction along the time axis. Note that the value of the candidate shift time s is in the range of $-Tu/2 < s \leq Tu/2$. Upon receiving from the judgment unit 203 a signal indicating that a predetermined number of ISI amounts has been accumulated, the window position candidate output unit 201 resets an output of the FFT window position candidates, and generates and outputs FFT window position candidates for the next symbol.

The ISI amount estimation unit 202 estimates, for each FFT window position candidate output from the window position candidate output unit 201, an ISI amount that is likely to occur, with use of the channel characteristics output from the channel characteristic estimation unit 106, and transmits the estimated ISI amounts to the judgment unit 203. The detail of this operation of the ISI amount estimation unit 202 is described below.

The judgment unit 203 accumulates a predetermined number of estimated ISI amounts transmitted from the ISI amount estimation unit 202 in one-to-one correspondence with the FFT window position candidates transmitted from the window position candidate output unit 201. When the predetermined number is reached, the judgment unit 203 selects an FFT window position candidate corresponding to the smallest estimated ISI amount from among the estimated ISI amounts that have been accumulated, and designates the selected FFT window position candidate as the FFT window position. Also, when the predetermined number is reached, the judgment unit 203 outputs to the window position candidate output unit 201 the signal indicating that the predetermined number of ISI amounts have been accumulated.

The Fourier transform unit 105 performs the FFT processing in the FFT window position designated by the judgment unit 203.

Figure 3:
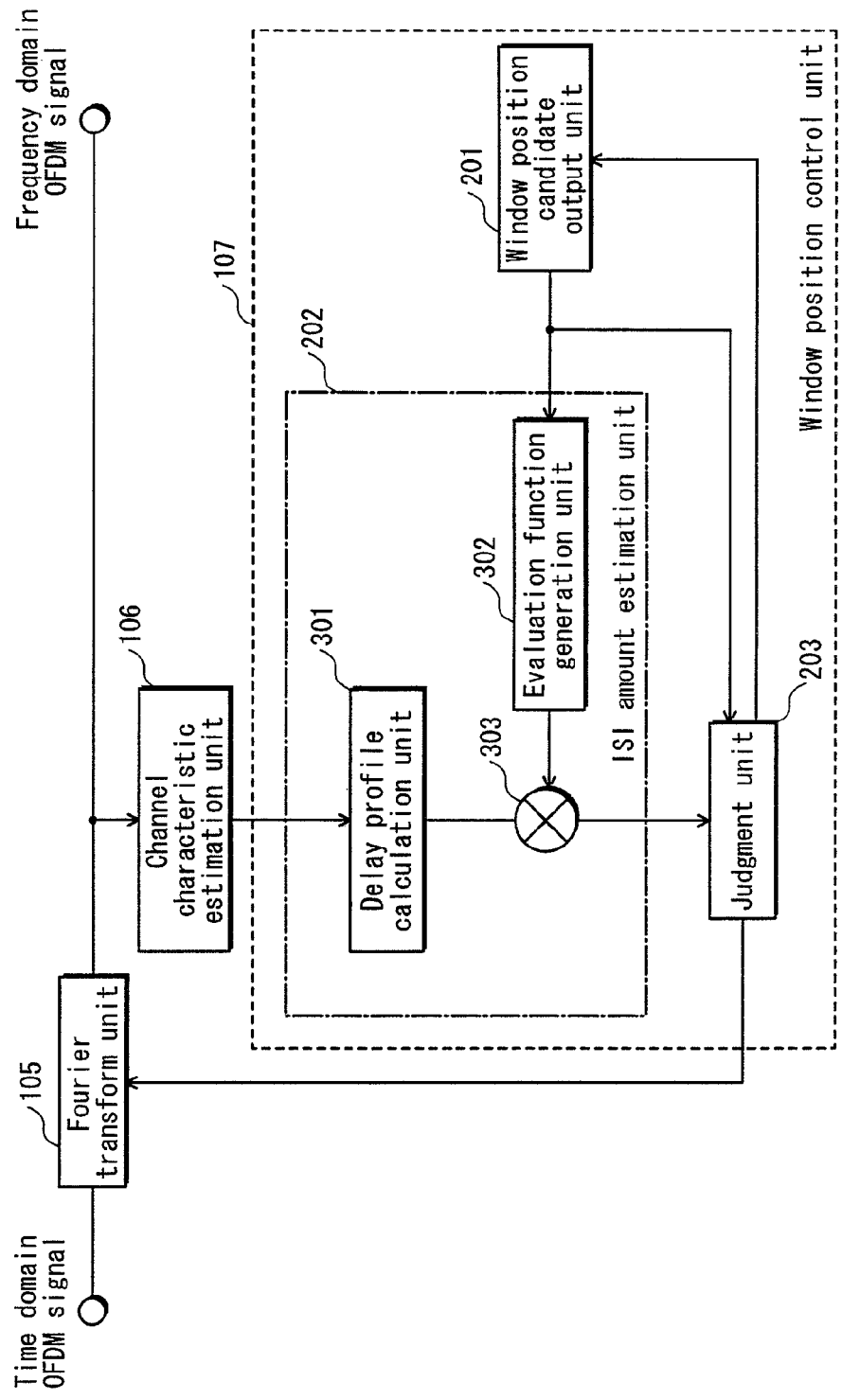
FIG. 3 is a functional block diagram showing the details of an ISI amount estimation unit in Embodiment of the present invention.

The following describes in detail the ISI amount estimation unit 202. FIG. 3 is a functional block diagram showing a detailed the functional structure of the ISI amount estimation unit 202.

As shown in FIG. 3, the ISI amount estimation unit 202 includes a delay profile calculation unit 301, an evaluation function generation unit 302, and a multiplier 303. Note that FIG. 3 also shows peripheral functional blocks of the ISI amount estimation unit 202.

The delay profile calculation unit 301 calculates a delay profile and transmits the delay profile to the multiplier 303. The delay profile is calculated by performing the IFFT processing on the channel characteristics transmitted from the channel characteristic estimation unit 106.

Figure 5:
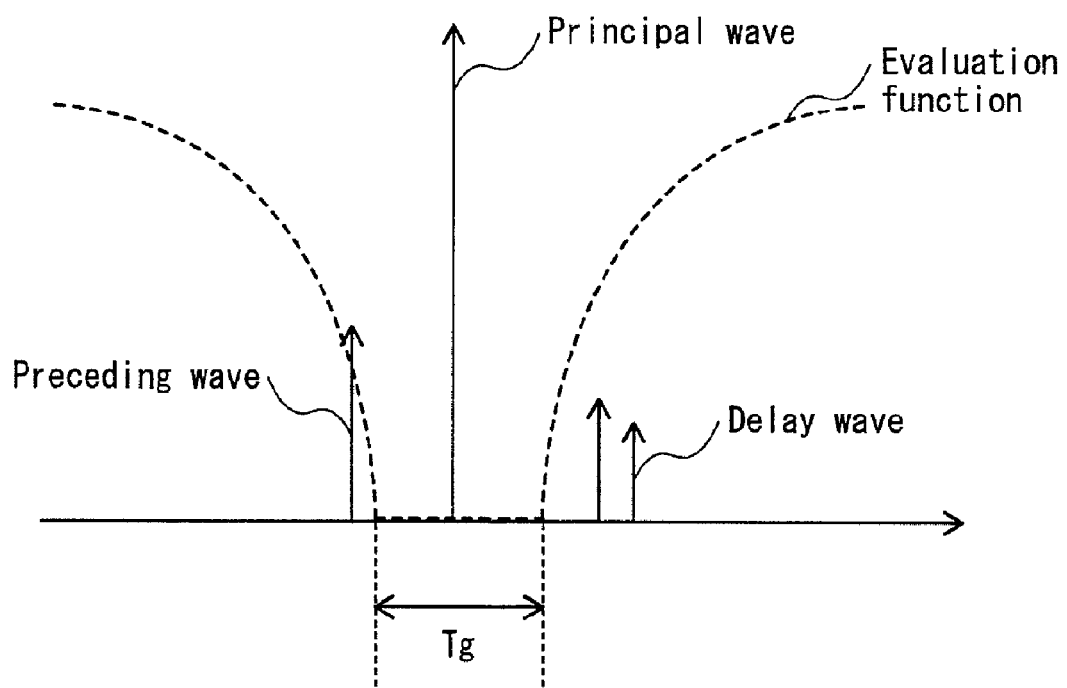
FIG. 5 shows a shape of an evaluation function e (i)

The evaluation function generation unit 302 generates an evaluation function corresponding to an FFT window position candidate transmitted from the window position candidate output unit 201, and transmits the evaluation function to the multiplier 303. Specifically, the evaluation function generation unit 302 generates an evaluation function e (i) as shown in FIG. 5, based on a shift amount shown by the candidate shift time s output from the window position candidate output unit 201, and outputs the evaluation function e (i) to the multiplier 303. The evaluation function e (i) has a fixed value (zero in the present Embodiment) during the GI period Tg, and a value greater than the fixed value in a period other than the GI period Tg. Note that the generated evaluation function is a function in which the center of the Tg period is shifted by the candidate shift time s output from the window position candidate output unit 201.

The evaluation function e (i) shown in FIG. 5 is used to estimate an ISI amount with respect to the incoming time of an incoming wave. The horizontal axis of the evaluation function e (i) represents time and the vertical axis thereof represents an ISI amount. If the incoming time of the incoming wave is within the GI (=Tg) period, the value of the evaluation function during the Tg period is zero since ISI does not occur. If the incoming time of the incoming wave is not within the GI (=Tg) period, the value of the evaluation function outside the Tg period indicates an ISI amount that is to occur at the timing when the incoming wave comes, since a neighboring symbol that enters in the FFT window becomes ISI.

As shown in FIG. 5, the evaluation function e (i) has a pot-like shape composed of a bottom part and end parts. The bottom part takes a fixed value for the duration corresponding to the Tg period because of the following reason. That is, in a case where a difference in incoming time between (i) a preceding wave positioned before the principal wave and (ii) a delay wave is within the Tg period, ISI does not occur as long as the FFT window position is appropriately set. Meanwhile, the value of the evaluation function e (i) monotonically increases with increasing distance from each end of the bottom part, in proportion to a time difference from each end of the bottom part. The monotonic increase in the value of each end portion indicates that an amount of a neighboring symbol entering in the FFT namely an ISI amount increases with increasing distance between a certain FFT window position and the incoming time of an incoming wave. Note that the rate of increase in the evaluation function e (i) at each end part may be variably adjusted as long as the rate is practically usable for the calculation of an estimated ISI amount. The rate of increase may be calculated by manufacturing a reception device equivalent to the present invention, and run a simulation.

The multiplier 303 calculates an estimated ISI amount and transmits the estimated ISI amount to the judgment unit 203. The estimated ISI amount is obtained by multiplying the delay profile transmitted from the delay profile calculation unit 301 by the evaluation function e (i) transmitted from the evaluation function generation unit 302.

The judgment unit 203 accumulates an ISI amount transmitted from the multiplier 303.

<Operation>

Figure 4:
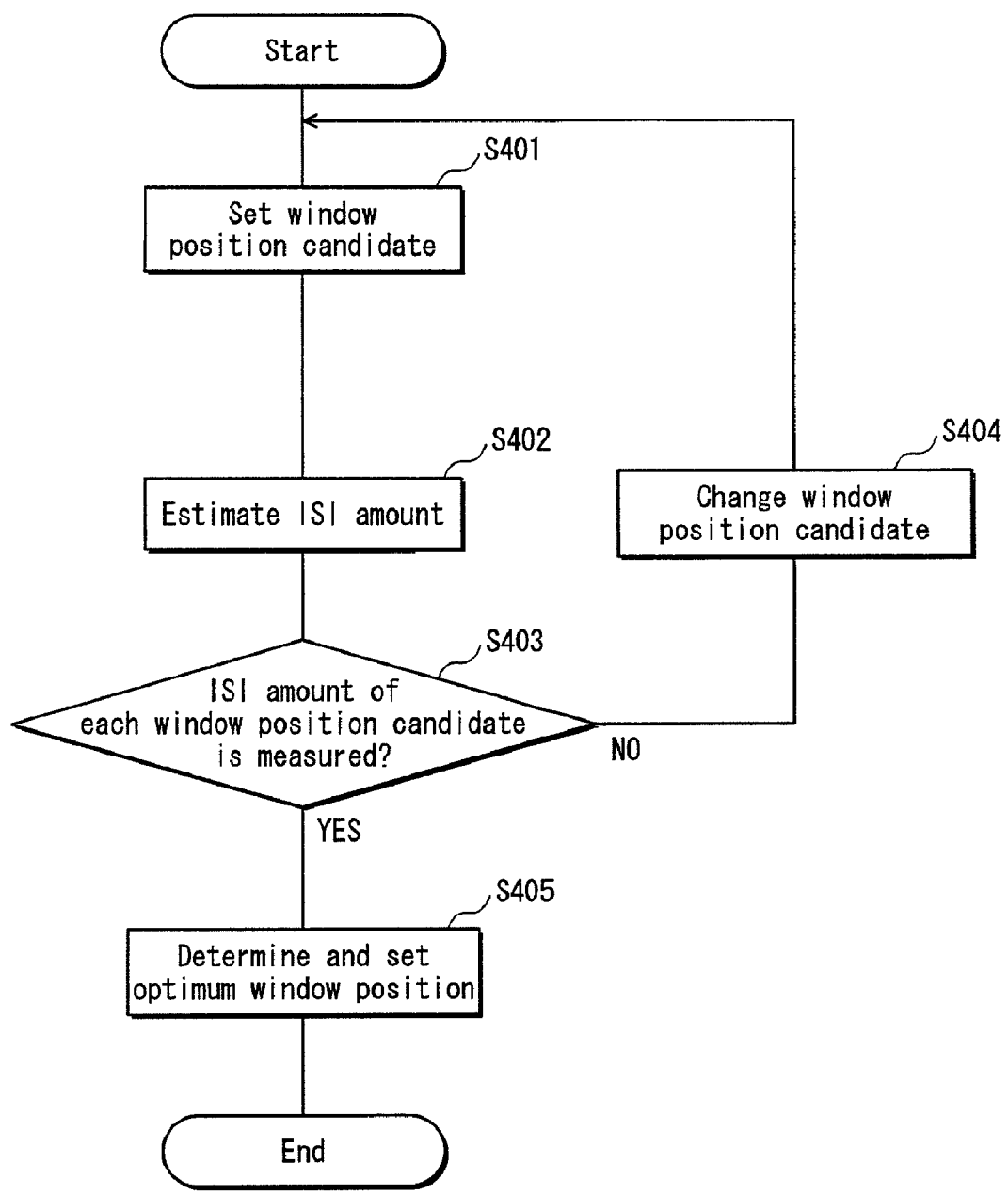
FIG. 4 is an operation flowchart showing an operation pertaining to the setting of an FFT window position of the window position control unit.

The following describes an operation of the window position control unit 107 in the present Embodiment, with reference to a flowchart shown in FIG. 4. A main feature of the present invention lies in that the FFT window position is determined based on an ISI amount estimated from the channel characteristics. Therefore, processing for receiving and decoding a signal is assumed to be similar to that of a conventional reception device, and an explanation of the processing is omitted here.

First, the window position candidate output unit 201 generates a plurality of FFT window position candidates. Note that the window position candidate output unit 201 generates a predetermined number of FFT window position candidates, each of which is a shift amount obtained by shifting the FFT window position at a predetermined time interval.

The window position candidate output unit 201 transmits one of the generated FFT window position candidates to the evaluation function generation unit 302 in the ISI amount estimation unit 202 (step S401).

Upon receipt of the FFT window position candidate, the evaluation function generation unit 302 generates an evaluation function as shown in FIG. 5, the center of which is shifted by the candidate shift time s shown by the FFT window position candidate. Then, the evaluation function generation unit 302 estimates an ISI amount based on a value obtained by the multiplier 303 multiplying the generated evaluation function by the delay profile output from the delay profile calculation unit 301 (step S402).

Upon receipt of the estimated ISI amount transmitted from the evaluation function generation unit 302, the judgment unit 203 stores therein the estimated ISI amount in association with information relating to the FFT window position candidate transmitted from the window position candidate output unit 201.

The judgment unit 203 compares the number of estimated ISI amounts that have been accumulated, with a number indicated by number information that indicates a predetermined number of ISI amounts that need to be accumulated. When the number of, estimated ISI amounts that have been accumulated has not reached the predetermined number (NO in step S403), the judgment unit 203 instructs the window position candidate output unit 201 to output the next FFT window position candidate. The window position candidate output unit 201 transmits the next FFT window position candidate to the evaluation function generation unit 302 and the judgment unit 203 (step S404). Then, the window position control unit 107 returns to the processing of step S401.

Meanwhile, when the judgment unit 203 judges that the number of estimated ISI amounts that have been accumulated matches the predetermined number indicated by the number information (YES in step S403), the judgment unit 203 determines the smallest estimated ISI amount among the estimated ISI amounts. Then, the window position control unit 107 shifts the FFT window position by a shift amount indicated by an FFT window position candidate corresponding to the smallest estimated ISI amount, determines the shifted FFT window position as a new FFT window position, and sets the new FFT window position for the Fourier transform unit 105 (step S405).

The Fourier transform unit 105 performs the FFT in the FFT window position set by the window position control unit 107.

The above describes the processing for determining the FFT window position. The following is a detailed explanation of a calculation method of the above-mentioned shift amount $S_{min}$.

Assume here that a time interval of a useful symbol length Tu is sampled with use of an arbitrary constant K, and that is an integer in a range of zero to K−1 inclusive. Then, the time at the $i^{th}$ sampling point is represented by i×Tu/K. The evaluation function at the time of the ith sampling point is represented by e (i). In this case, the judgment unit 203 needs to accumulate K ISI amounts.

Assume that $p_i$ represents a delay profile (complex value) calculated by the delay profile calculation unit 301, s represents a candidate shift time set by the window position candidate output unit 201, and N(s) represents an ISI evaluation value that is an amount of ISI likely to occur when a predetermined FFT window position is shifted by the candidate shift time s. Then, the ISI evaluation value N(s) is calculated with use of the following Expression 1.

$$N(s) = \sum_{i=0}^{K-1} e(i-s)|p_i|^2 \qquad \text{[Expression 1]}$$

The computation represented by the Expression 1 is performed by the multiplier 303. The multiplier 303 performs the computation represented by the Expression 1, for each candidate shift time s output from the window position candidate output unit 201. The judgment unit 203 accumulates the ISI amounts obtained by the above-described computation.

Then, the judgment unit 203 performs the computation represented by the following Expression 2 when the number of accumulated ISI amounts has reached the predetermined number.

$$S_{min} = \arg\min[N(s)] \qquad \text{[Expression 2]}$$

The judgment unit 203 performs the computation represented by the Expression 2 to select an ISI amount having the smallest value from among the accumulated ISI amounts. Then, the judgment unit 203 shifts the FFT window position from a reference position thereof, by the shift time corresponding to the ISI amount selected based on the Expression 2, and sets the shifted FFT window position for the Fourier transform unit 105.

Finally, an explanation is provided of the shifting of the FFT window position.

The following describes processing for time shifting by searching for the FFT window position with use of the evaluation function e (i), with reference to FIGS. 6A-8B.

Figure 6A:
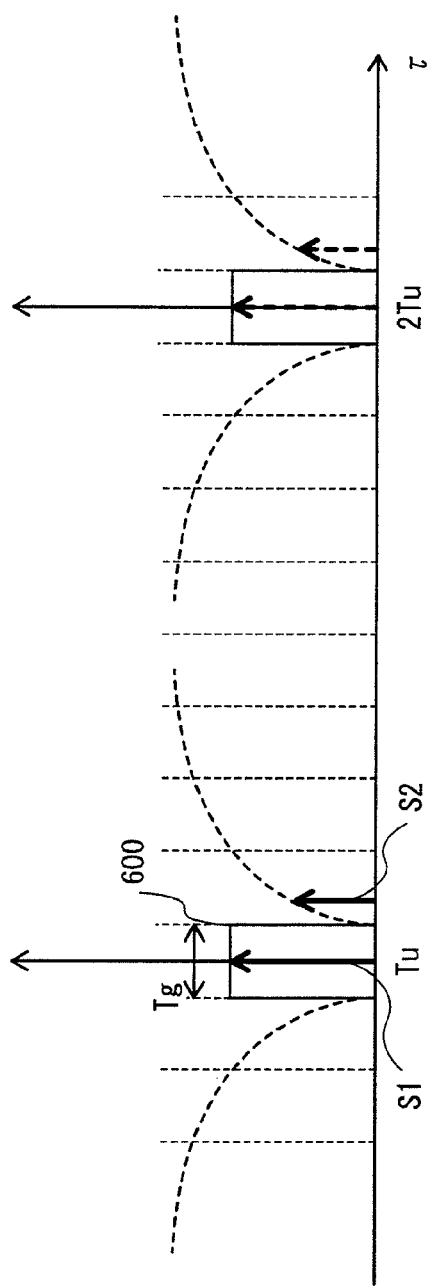
FIGS. 6A and 6B each schematically show the first stage of an FFT window position shift.
Figure 8A:
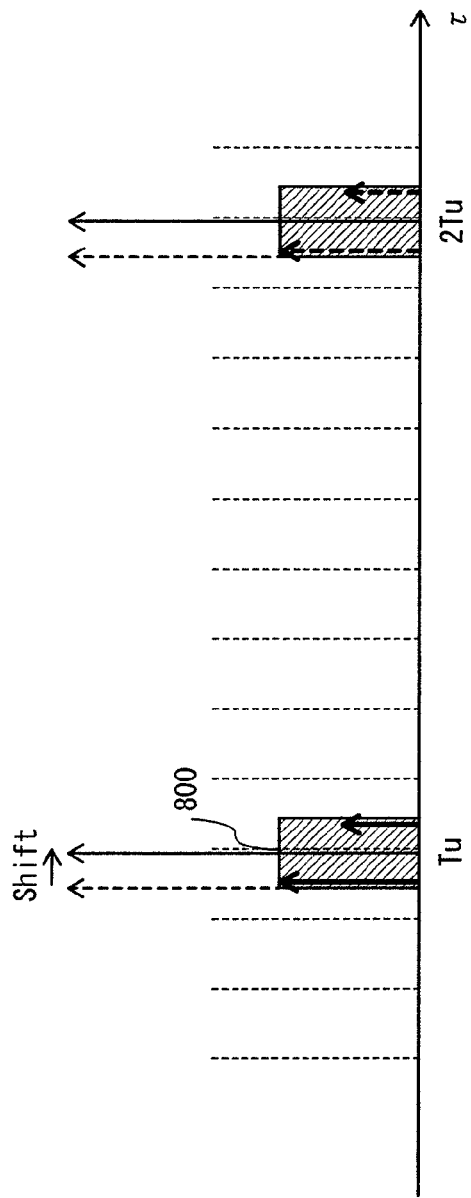
FIGS. 8A and 8B each schematically show the third stage of the FFT window position shift.

Each of FIG. 6A, FIG. 7A, and FIG. 8A shows the delay profile of a two-wave multipath channel. In each of FIGS. 6A to 8A, the horizontal axis represents time, and the vertical axis represents received power of each incoming wave.

Figure 6B:
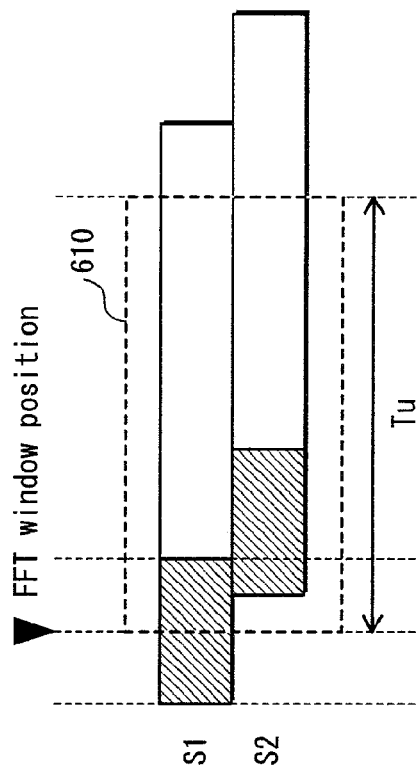
Figure 8B:
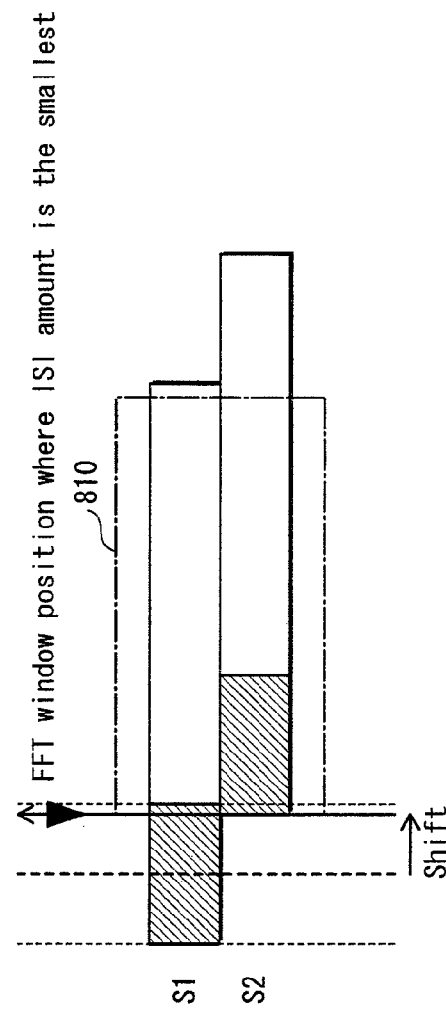

Also, each of FIG. 6B, FIG. 7B, and FIG. 8B schematically shows a transmission symbol of an OFDM signal. Each of the transmission symbols corresponds to FIG. 6A, FIG. 7A, and FIG. 8A, respectively. The symbol period of each OFDM signal is composed of a useful symbol period Tu and a guard interval (hereinafter "GI") period Tg (shown by diagonally shaded parts).

Each of the reference numbers 610, 710, and 810 in FIGS. 6B-8B indicates an FFT window having a duration of Tu. Each of the reference numbers 600, 700, and 800 in FIGS. 6A-8A indicates a range in which no ISI occurs, when the FFT window is set in each of the positions 610, 710, and 810 in FIGS. 6B-8B. The duration of each of 600, 700, and 800 is the GI period Tg. ISI occurs when each of the signals is outside the ranges 600, 700, and 800, respectively and the amount of ISI increases with increasing distance from each of the ranges 600, 700, and 800.

Here, a two-wave multipath channel is taken as an example. In this case, to find the FFT window position where the ISI amount is the smallest, the ISI evaluation value N(s) is obtained by multiplying the delay profile by the evaluation function e (i−s) at the candidate shift time s, as shown in FIG. 6A. As shown in FIGS. 7A and 7B, the ISI evaluation value N(s) is obtained for more than one candidate shift time s, by changing the candidate shift time s.

The evaluation function e (i−s) is time shifted by changing the candidate shift time s. Corresponding to this time shift, the range 700 in which ISI does not occur is also time shifted. In FIGS. 7A and 7B, it is assumed that an ISI amount that occurs when the FFT window position is time shifted as shown in the reference number 710 is estimated. After each ISI evaluation value has been obtained for the respective candidate shift times by repeating the above-described steps, a candidate shift time corresponding to the smallest ISI evaluation value is detected and set to $S_{min}$. As shown in FIGS. 8A and 8B, the judgment unit 203 sets the FFT window position by shifting the reference position of the FFT window by $S_{min}$. Note that the delay profile used for the candidate shift times s is of the same time. Therefore, the correlation of the ISI evaluation value in each position of the FFT window does not change.

As described above, by taking into consideration the ISI evaluation function that shows a time difference of, when an incoming wave is outside the GI period, the incoming time of the incoming wave from the GI period. This ensures the detection of the FFT window position corresponding to the smallest ISI amount. As a result, the reception quality of a reception signal is improved. Also, equalization processing with use of channel characteristics having a high accuracy enables stable reception in various channel environments. Furthermore, since the FFT computation is not actually performed for each FFT window position candidate to estimate the ISI amounts, an amount of computation is generally smaller than that performed in the method described in Patent Document 2.

<Variation 1>

In the above-described embodiment, ISI amounts are estimated with use of the evaluation function. However, ISI amounts may be estimated with use of the following method.

Note that Variation 1 is the same as the present embodiment except for a method for estimating ISI amounts. Therefore, the following only explains the method for estimating ISI amounts.

<Structure>

Figure 9:
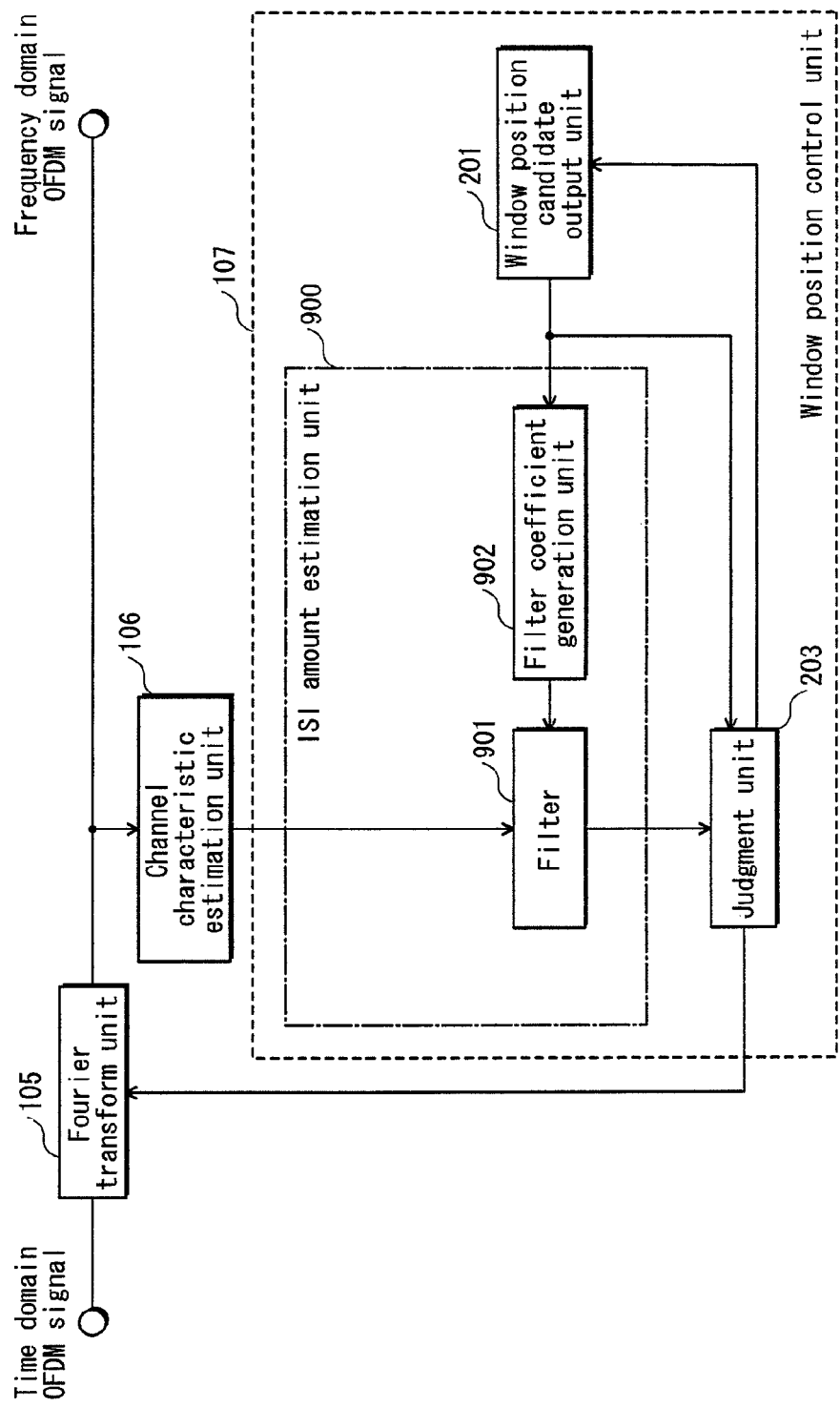
FIG. 9 is a functional block diagram showing the details of an ISI amount estimation unit according to Variation 1 of the present invention.

First, an explanation is provided of an ISI amount estimation unit in Variation 1. FIG. 9 is a functional block diagram showing the details of the IST amount estimation unit according to Variation 1. Variation 1 is different from the present embodiment in that the reception device 100 includes an ISI amount estimation unit 900 instead of the ISI amount estimation unit 202.

The ISI amount estimation unit 900 includes a filter 900 and a filter coefficient generation unit 902.

The filter 901 filters channel characteristics transmitted from the channel characteristic estimation unit 106, in accordance with a filter coefficient set by the filter coefficient generation unit 902. The filter 901 has filter characteristics based on the evaluation function described above in the present embodiment, and basically prevents a signal from passing for the duration corresponding to the Tg period. This structure enables the filter 901 to pass a signal that occurs as ISI.

The filter coefficient generation unit 902 outputs a filter coefficient obtained by rotating the phase of the filter characteristics from its original position. Here, the phase of the filter characteristics is rotated for the number of candidate shift times s shown by the FFT window position candidates output from the window position candidate output unit 201.

The judgment unit 203 stores therein, for each FFT window position candidate output by the window position candidate output unit 201, an estimated value of an ISI amount that is the electric power of a signal that passes the filter 901. After obtaining a predetermined number of estimated ISI amounts, the judgment unit 203 sets a new FFT window position for the Fourier conversion unit 105, where the new FFT window position is obtained by shifting the FFT window position by the candidate shift time s of an FFT window position candidate corresponding to an estimated ISI amount having the smallest electric power.

According to the Embodiment described above, the FFT window position is specified by performing computation in a time domain with use of the delay profile. However, according to the structure described in Variation 1, the FFT window position is also specified by performing computation in a frequency domain.

<Variation 2>

In Variation 1 described above, the filter coefficient is changed to correspond to a change of the FFT window position. However, in Variation 2, an explanation is provided of a method in which the filter coefficient does not need to be changed.

Note that, similarly to Variation 1, Variation 2 is the same as the present embodiment except a method for estimating ISI amounts. Therefore, the following only explains the method for estimating ISI amounts.

<Structure>

Figure 10:
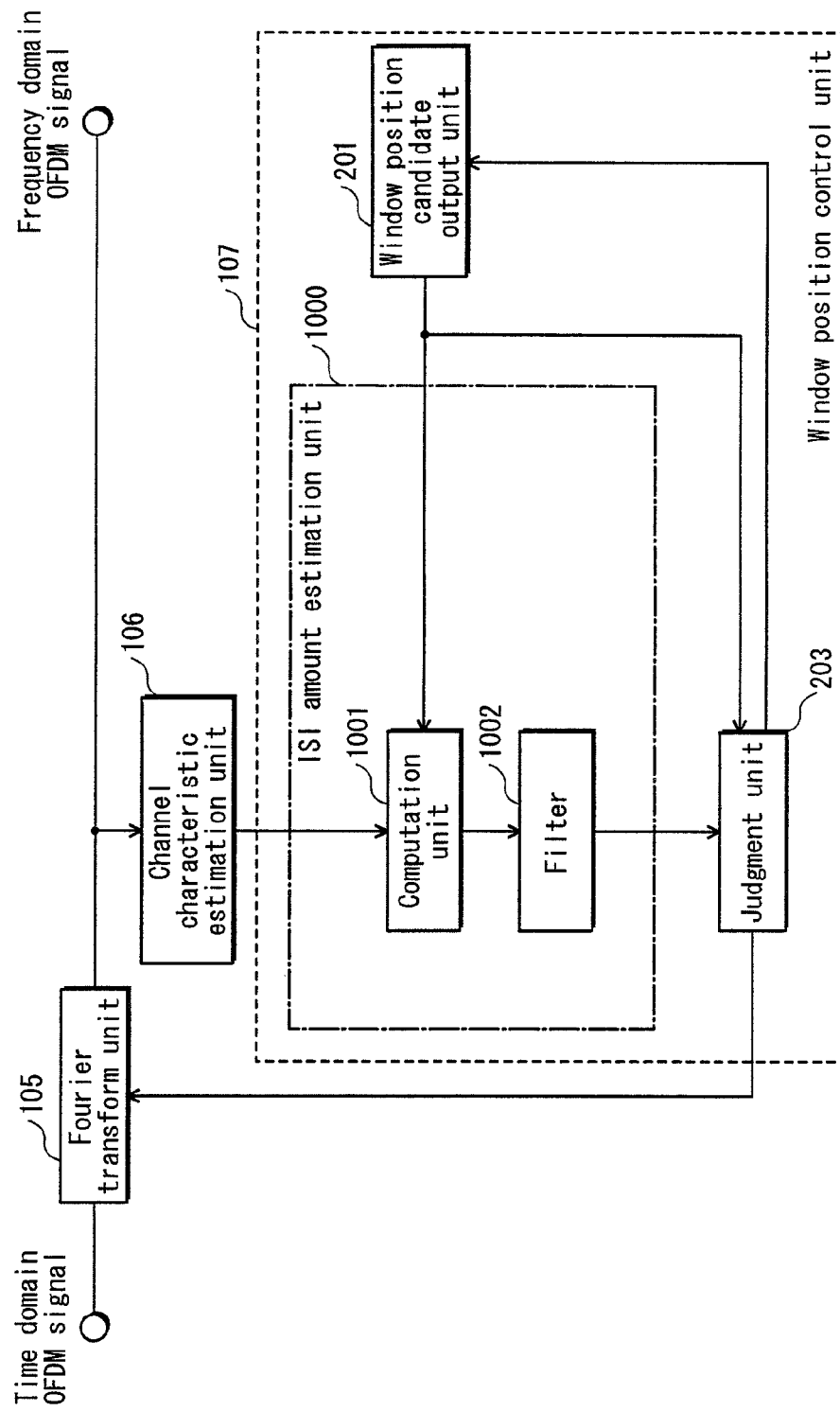
FIG. 10 is a functional block diagram showing the details of an ISI amount estimation unit according to Variation 2 of the present invention.
Figure 11:
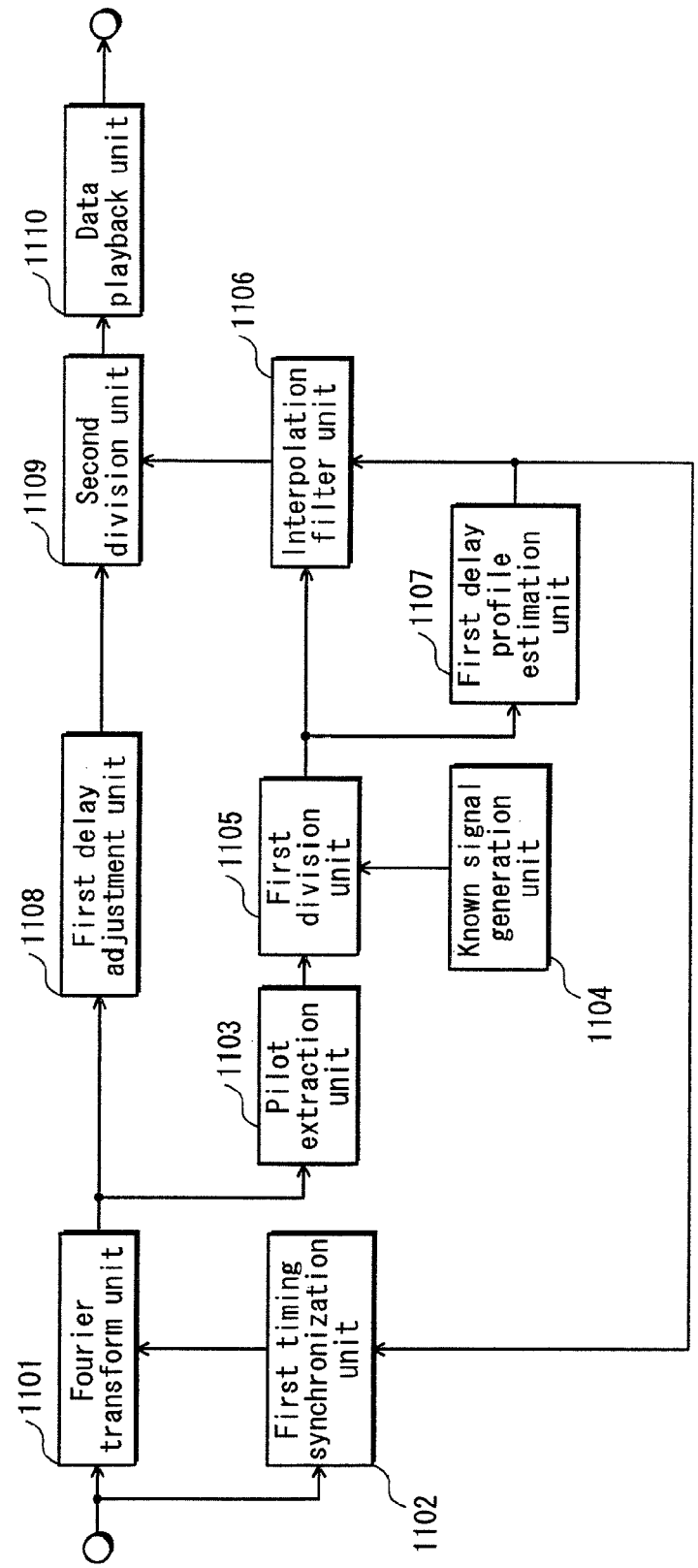
FIG. 11 is a functional block diagram showing a conventional reception device in Patent Document 1.
Figure 12:
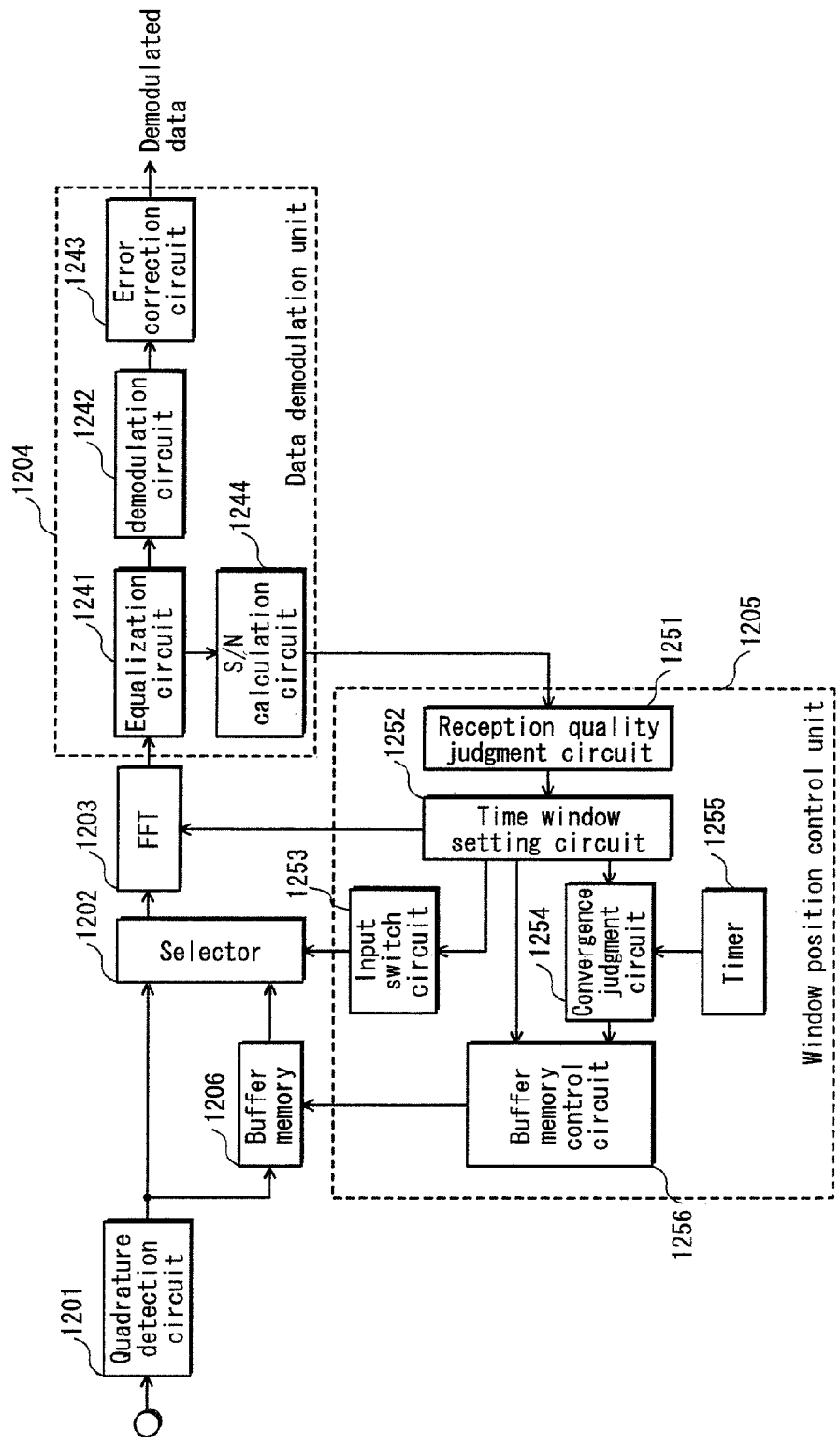
FIG. 12 is a functional block diagram showing a conventional reception device in Patent Document 2.
Figure 13A:
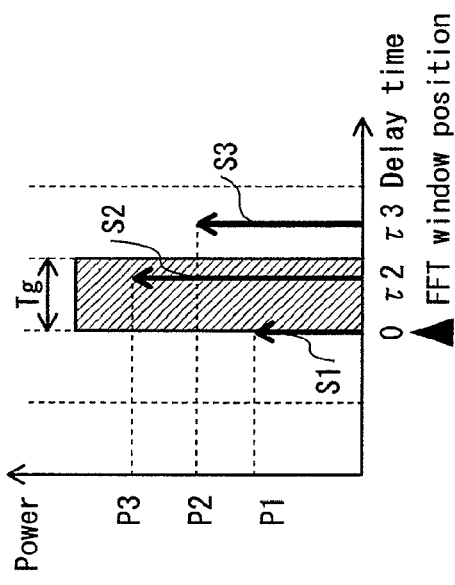
FIGS. 13A and 13B each schematically show a particular application of the setting of a conventional FFT window position in Patent Document 1.
Figure 13B:
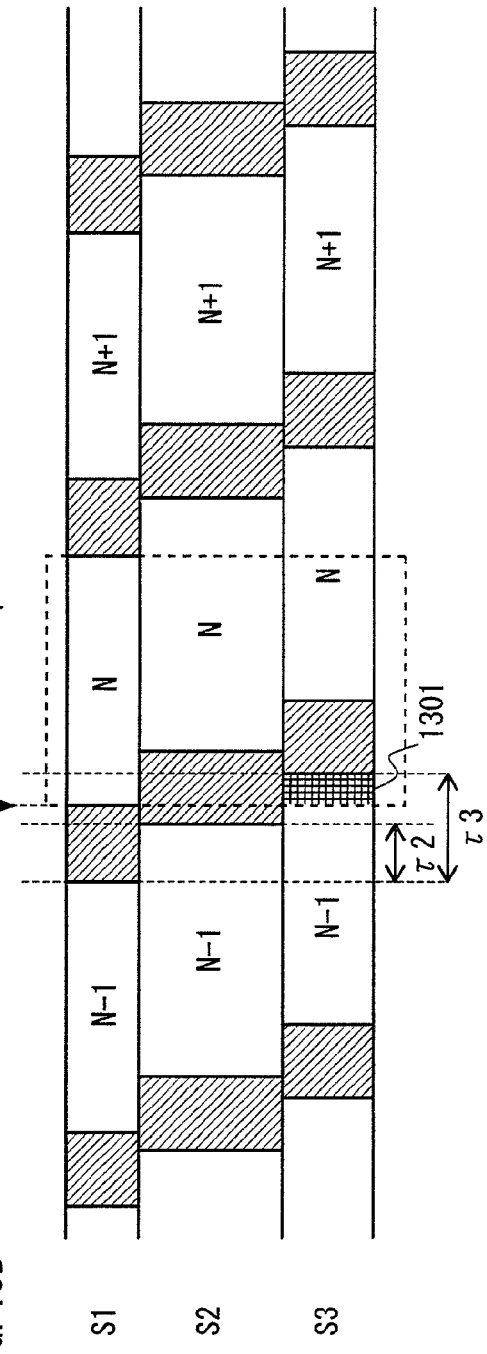
Figure 14A:
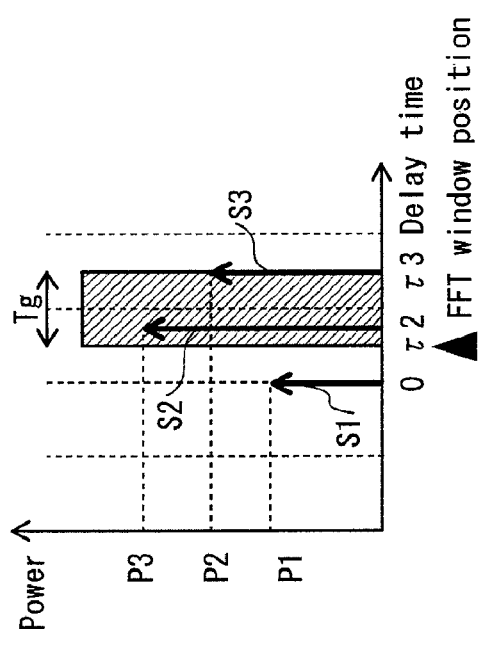
FIGS. 14A and 14B each schematically show an example of an FFT window position setting in the present invention.
Figure 14B:
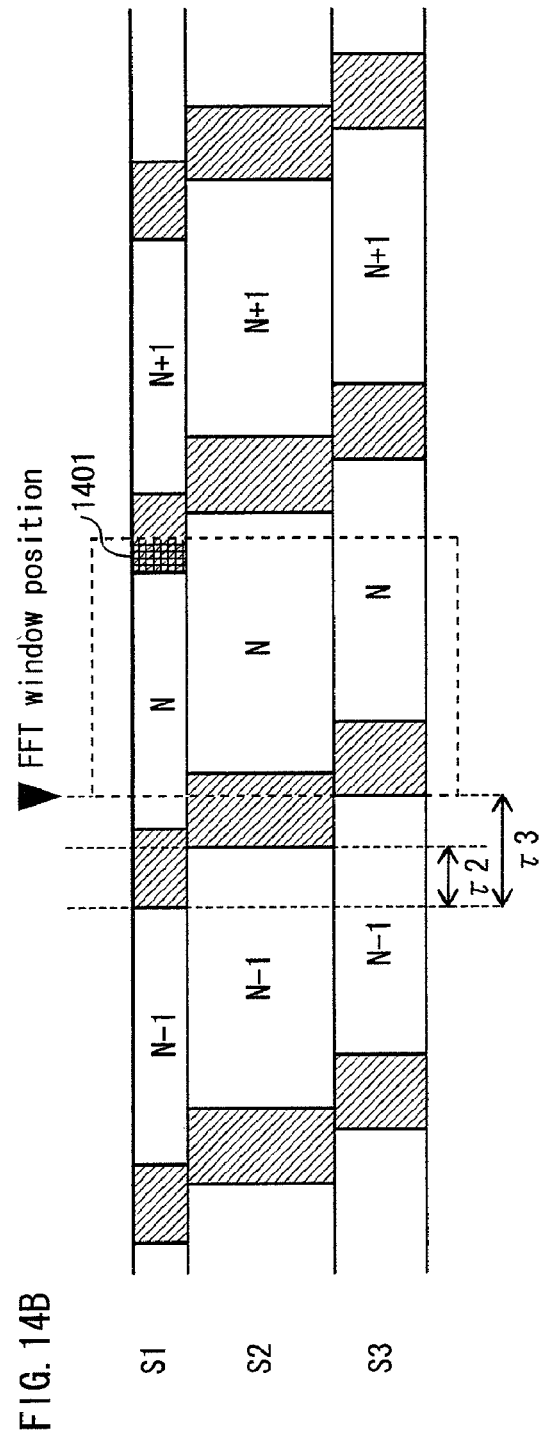
Figure 15A:
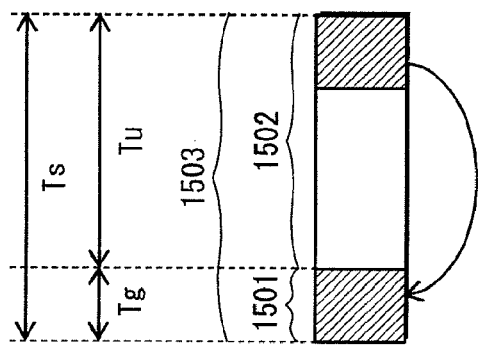
FIGS. 15A and 15B each schematically show a symbol structure of an OFDM signal.
Figure 15B:
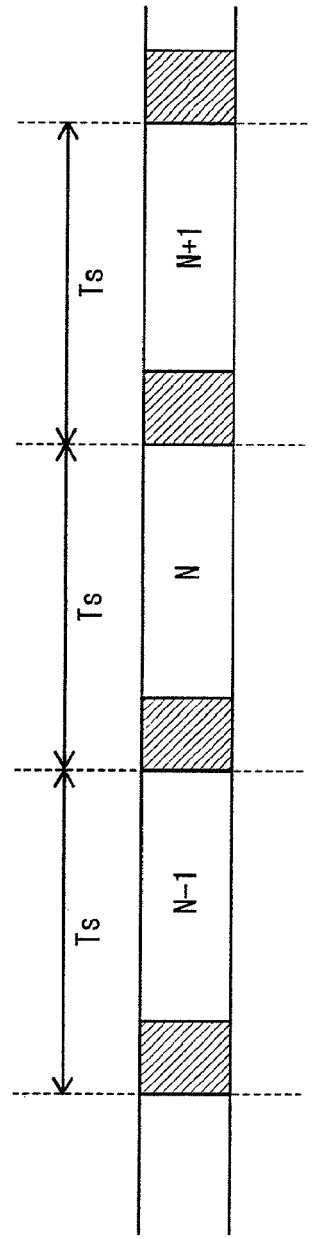
Figure 18:
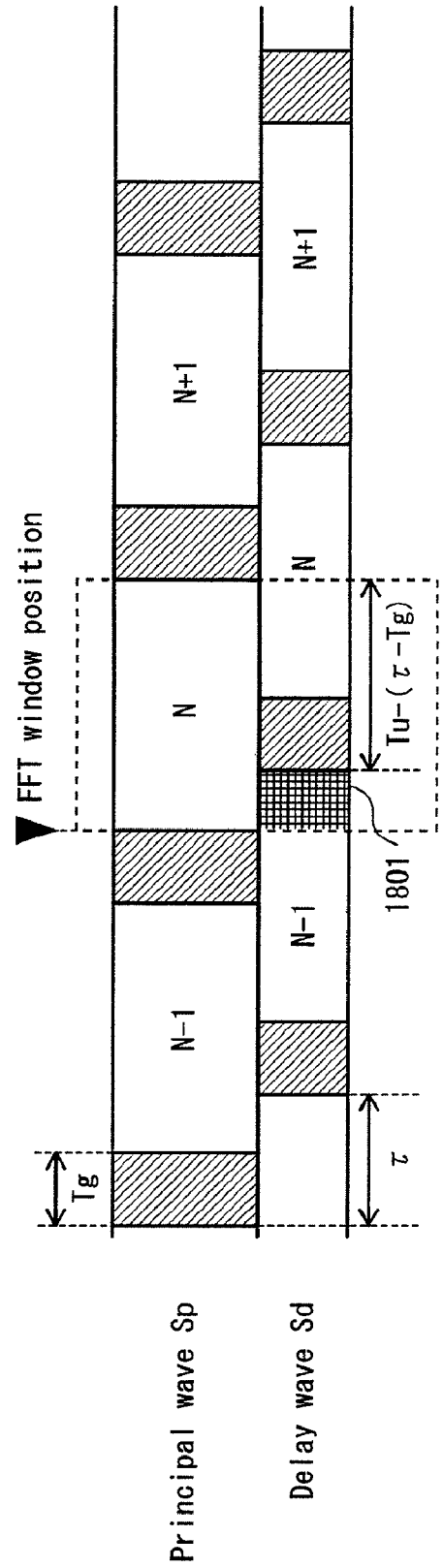
FIG. 18 schematically shows an ICI/ISI occurrence mechanism when $\tau > Tg$.

FIG. 10 is a functional block diagram showing the details of an ISI amount estimation unit according to Variation 2 of the present invention. Variation 2 is different from the present Embodiment in that the reception unit 100 includes an ISI amount estimation unit 1000 instead of the ISI amount estimation unit 202.

The ISI amount estimation unit 1000 includes a computation unit 1001 and a filter 1002.

The computation unit 1001 calculates a phase rotation vector corresponding to a candidate shift time s shown by an FFT window position candidate output from the window position candidate output unit 201, multiplies the calculated phase rotation vector by the channel characteristics estimated by the channel characteristic estimation unit 106, rotates the phase of the channel characteristics in accordance with the candidate shift time s, and transmits the rotated channel characteristics to the filter 1002.

The filter 1002 filters the signal output from the computation unit 1001, in accordance with predetermined filter characteristics, and outputs the filtered signal to the judgment unit 203. Note that the filter characteristics of the filter 1002 are generated based on the evaluation function shown by the above-described embodiment, and show the similar characteristics to that of Variation 1 although the filtering position does not change.

Note that, similarly to Variation 1, the judgment unit 203 stores therein, for each FFT window position candidate, an estimated value of an ISI amount that is the electric power of a signal that passes the filter 1002. After obtaining a predetermined number of estimated ISI amounts, the judgment unit 203 sets a new FFT window position for the Fourier conversion unit 105, where the new FFT window position is obtained by shifting the reference position of the FFT window by the candidate shift time s of an FFT window position candidate corresponding to an estimated ISI amount having the smallest electric power.

In Variation 1, the filter coefficient is changed to correspond to a shift of the FFT window position. However, in Variation 2, the FFT window position corresponding to the smallest ISI amount is not determined by changing the filter coefficient, but is determined by rotating the phase of the channel characteristics, thereby changing the frequency domain.

<Supplementary Remarks>

Although the present invention has been explained based on the above-described embodiment and variations, the present invention is of course not limited to these embodiment and variations. For example, the following modifications are construed as being included as the technical idea of the present invention.

(1) In the above-described embodiment, an ISI amount is estimated for each of a plurality of FFT window position candidates. Then, based on the estimated ISI amounts, the FFT window position to be set for the Fourier transform unit 105 is selected from among the plurality of FFT window position candidates.

However, the present invention is not limited to such, and the FFT window position may be more accurately determined by including the following structure. That is, after accumulating the estimated ISI amounts corresponding one-to-one to the FFT window position candidates in the same manner as the above-described Embodiment, the judgment unit 203 may further calculate an approximate expression for each of the estimated ISI amounts with use of a least-squire method, etc. Then, the judgment unit 203 may obtain the smallest estimated ISI amount with use of the approximate expressions.

Subsequently, the judgment unit 203 may obtain an FFT window position candidate corresponding to the smallest estimated ISI amount that has been calculated, and may set the FFT window position candidate as the FFT window position for the Fourier transform unit 105.

(2) Each end part of the evaluation function e (i) as shown in the above-described Embodiment has a quadratic shape. However, it is not limited to such as long as each end part has a tendency to increase. For example, the shape may be linear.

(3) In the above-described embodiment, the explanations are provided by taking the OFDM transmission signal as an example. However, it is not limited to such. The signal may take any transmission form other than the OFDM transmission as long as it is a multicarrier signal.

Note that methods using the OFDM transmission include the following: a wireless LAN (IEEE802.11a/g); terrestrial digital broadcasting (DVB-T/H/T2, ISDB-T); Wi-MAX (IEE802.16); a next-generation mobile communication; and so on. Such methods are applicable to the present invention.

(4) In the above-described Variations 1 and 2, an ISI amount is estimated by measuring the electric power of a signal that passes during a period other than the Tg period, with use of a band elimination filter having a characteristic of preventing a signal from passing for the duration corresponding to the Tg period.

However, it is not limited to such. An ISI amount may be estimated with use of a bandpass filter having a characteristic of letting a signal pass only for the duration corresponding to the Tg period. In this case, the larger the ISI amount is, the smaller the electric power of the signal that passes the bandpass filter becomes. Therefore, a window position candidate that is set for the Fourier transform unit 105 as the FFT window position corresponding to the smallest ISI amount is the one corresponding to an ISI amount when the electric power of the signal that passes the bandpass filter is the largest.

(5) In the above-described Embodiment, the ISI amount estimation unit 202 estimates an ISI amount with use of the channel characteristics estimated by the channel characteristic estimation unit 106 without modification. However, it is possible to perform computation on the estimated channel characteristics in the frequency domain by decimating the channel characteristics at an N-sample interval.

The following explains the above-described computation processing with use of FIG. 6A. For example, when the estimated channel characteristics in the frequency domain are decimated at every three sampling points, imaging of an incoming wave in the time domain occurs in a 1/3 cycle, in addition to the principal wave and the delay wave shown in FIG. 6A. This means that a principal wave, a delay wave, etc. also appear (are imaged) in the vicinity of the position Of Tu+Tu/3, and in the vicinity of the position of Tu+2Tu/3. Even in this case, the search of the FFT window position is conducted in the vicinities of Tu and 2Tu. However, if the Tg period is long, namely the GI is long, or if a delay spread is large, aliasing such as an incoming wave imaged in the vicinity of the position of Tu+Tu/3 occurs. In this case, the imaged incoming wave also becomes the evaluation target of the evaluation function, which makes it impossible to estimate an ISI amount accurately. This problem arises because of the following reasons. That is, the longer the Tg period is, the wider the evaluation range is in both end parts of the evaluation function. Also, if the delay spread is large, the search range of the FFT window position needs to be wide as well. In this case, when the evaluation target of the evaluation function is set at an end of the search range of the FFT window position, even an imaging that occurs in a 1/N cycle will be included as the evaluation target of the evaluation function.

In other words, in a case where the Tg period is short or the delay spread is small, an imaging that occurs due to the decimation at the N-sample interval can be ignored, namely the imaging occurs outside the evaluation range of the evaluation function. Therefore, the computation may be performed by decimating the channel characteristics at the N-sample interval. In this way, the data amount of the channel characteristics multiplied by the evaluation function decreases. As a result, the computation amount is reduced and the time taken to determine the FFT window Position is shortened. Note that the value N is determined in accordance with the pass band of a frequency axis interpolation filter, a GI length, and a search range of the FFT window position.

(6) In the above-described embodiment, the FFT window position is calculated on a symbol-by-symbol basis. However, when the reception device is used in a place where the environment of a channel is relatively stable, the FFT window position may be determined at an interval of a predetermined number of symbols. In this case, once the FFT window position is determined for one symbol, the FFT window position is also used for symbols subsequent to the symbol until the next FFT window position is determined.

It is also possible that the FFT window position is averagely obtained for a plurality of symbols.

(7) In the above-described embodiment, a period at the bottom part of the evaluation function is set to the Tg period. However, the period at the bottom part may be flexibly changed in accordance with the system or conditions for implementation.

(8) Although not specifically described in the above embodiment, the FFT window position determined by the window position control unit 107 is usually applied to the next symbol onwards. In other words, the FFT window position obtained by estimating an ISI amount from the channel characteristics of the $N^{th}$ symbol is applied to the FFT processing performed for the $N+1^{th}$ symbol.

However, the FFT window position obtained from the $N^{th}$ symbol in the above-described manner may be applied to the $N^{th}$ symbol. In this case, the following processing is performed. The FFT window position may be determined by estimating the ISI amount from the channel characteristics of the $N^{th}$ symbol. A received signal may be temporarily stored in a buffer or the like before being transmitted. Then, the FFT may be performed by applying the determined FFT window position to the $N^{th}$ symbol of the signal that has been temporarily stored, so as to demodulate the signal. The signal is more accurately demodulated by applying, to the $N^{th}$ symbol, the FFT window position determined based on the ISI amount that is estimated from the channel characteristics obtained from the $N^{th}$ symbol.

(9) In the above-described embodiment, the reception device 100 and the display device 111 are described as different devices. However, the reception device 100 may be mounted inside the display device 111. For example, the present invention may be realized as a digital television. In this case, the digital television displays a program in the following manner. First, the digital television receives a broadcast wave (i.e., OFDM signal) from a broadcast station. After determining the FFT window position with use of the method described in the above-described embodiment, the digital television demodulates the received signal by performing the FFT processing in the FFT window position, and displays the program.

(10) A control program comprising program code for causing a processor (e.g., reception device or digital television) and the circuits connected thereto to perform the processing fox determining the FFT window position, etc. (see FIG. 4) described in the above embodiment may be recorded on a recording medium or distributed via various channels. The recording medium for storing the control program may be an IC card, a hard disk, an optical disc, a flexible disk, a ROM, or the like. The distributed control program becomes available for use by being stored in a memory or the like that is readable by the processor. The functions described in the above embodiment are realized by the processor executing the control program.

(11) Each of the functional parts according to the above-described embodiment may be realized by one LSI (Large Scale Integration) or a plurality of LSIs. Also, two or more of the plurality of functional parts may be realized by one LSI.

Note that although referred to as LSI here, the LSI may be referred to as an IC (Integrated Circuit), a system LSI, a super LSI or an ultra LSI in accordance with the degree of integration. In addition, a method for integrating circuits is not limited to an LSI, and may be realized by a dedicated circuit or a general-purpose processor. It is also possible to use an FPGA (Field Programmable Gate Array) that is programmable after the LSI is produced, or a reconfigurable processor that allows the reconfiguration of the connection and setting of circuit cells in the LSI. In addition, if a technology of integration that can substitute for the LSI appears by a progress of semiconductor technology or another derivational technology, it is possible to integrate function blocks by using the technology. A possible field for integrating the function blocks can be an adaptation of biotechniques.

INDUSTRIAL APPLICABILITY

A reception device according to the present invention performs, on a received OFDM signal, an FFT in an FFT window position appropriately set by estimating an ISI amount based on channel characteristics, and can be used in a digital television or the like.

The invention claimed is:

1. A reception device for receiving an OFDM (Orthogonal Frequency Division Multiplexing) signal, comprising:
   a Fourier transform unit operable to perform Fourier transform on the received OFDM signal on a symbol-by-symbol basis in a designated FFT (Fast Fourier Transform) window position, so as to obtain a transformed signal;
   a channel characteristic estimation unit operable to estimate channel characteristics based on the transformed signal; and
   a window position control unit operable to estimate, based on the channel characteristics, a plurality of ISI (Inter Symbol Interference) amounts that are each an amount of ISI occurring if the Fourier transform is performed in a corresponding one of FFT window position candidates, and to designate, as the FFT window position, one of the plurality of FFT window position candidates that corresponds to a smallest estimated ISI amount.

2. The reception device of claim 1 wherein the window position control unit includes:
   an ISI amount estimation unit operable to estimate, the plurality of ISI amounts based on the channel characteristics; and
   a determination unit operable to determine the FFT window position candidate corresponding to the smallest estimated ISI amount, and designate the FFT window position candidate as the FFT window position.

3. The reception device of claim 2 wherein the ISI amount estimation unit includes:
   a delay profile calculation unit operable to calculate a delay profile based on the channel characteristics;
   an evaluation function generation unit operable to generate a plurality of evaluation functions corresponding one-to-one to the plurality of FFT window position candidates; and
   a multiplication unit operable to estimate the plurality of ISI amounts by multiplying each evaluation function and the delay profile.

4. The reception device of claim 2 wherein the ISI amount estimation unit includes:
   a filter coefficient estimation unit operable to generate a plurality of filter coefficients corresponding one-to-one to the plurality of FFT window position candidates; and
   a filter unit operable to estimate the plurality of ISI amounts by filtering the channel characteristics with use of the plurality of filter coefficients.

5. The reception device of claim 2 wherein the ISI amount estimation unit includes:
   a computation unit operable to rotate a phase of the channel characteristics in accordance with each FFT window position candidate, so as to obtain rotated channel characteristics corresponding one-to-one to the FFT window position candidates; and
   a filter unit operable to estimate the plurality of ISI amounts by filtering the rotated channel characteristics.

6. The reception device of claim 1 wherein the window position control unit includes:
   an ISI amount estimation unit operable to estimate, the plurality of ISI amounts based on the channel characteristics; and
   a specification unit operable to calculate a smallest ISI amount from the plurality of estimated ISI amounts, specify an FFT window position candidate corresponding to the smallest calculated ISI amount, and designate the specified FFT window position candidate as the FFT window position.

7. The reception device of claim 6 wherein the ISI amount estimation unit includes:
   a delay profile estimation unit operable to estimate a delay profile from the channel characteristics;

an evaluation function generation unit operable to generate evaluation functions corresponding one-to-one to the plurality of FFT window position candidates; and a multiplication unit operable to estimate the plurality of ISI amounts by multiplying the evaluation functions and the delay profile.

8. The reception device of claim 6 wherein the ISI amount estimation unit includes:
    a filter coefficient estimation unit operable to generate a plurality of filter coefficients corresponding one-to-one to the plurality of FFT window position candidates; and
    a filter unit operable to estimate the plurality of ISI amounts by filtering the channel characteristics with use of the plurality of filter coefficients.

9. The reception device of claim 6 wherein the ISI amount estimation unit includes:
    a computation unit operable to rotate a phase of the channel characteristics in accordance with each FFT window position candidate, so as to obtain rotated channel characteristics corresponding one-to-one to the FFT window position candidates; and
    a filter unit operable to estimate the plurality of ISI amounts by filtering the rotated channel characteristics.

10. A reception method for receiving an OFDM (Orthogonal Frequency Division Multiplexing) signal, comprising the steps of:
    performing Fourier transform on the received OFDM signal on a symbol-by-symbol basis in a designated FFT (Fast Fourier Transform) window position, so as to obtain a transformed signal;
    estimating channel characteristics based on the transformed signal; and
    estimating, based on the channel characteristics, a plurality of ISI (Inter Symbol Interference) amounts that are each an amount of ISI occurring if the Fourier transform is performed in a corresponding one of FFT window position candidates, and designating, as the FFT window position, one of the plurality of FFT window position candidates that corresponds to a smallest estimated ISI amount.

11. A reception program causing a computer to receive and demodulate an OFDM (Orthogonal Frequency Division Multiplexing) signal, the process comprising the steps of:
    performing Fourier transform on the received OFDM signal on a symbol-by-symbol basis in a designated FFT (Fast Fourier Transform) window position, so as to obtain a transformed signal;
    estimating channel characteristics based on the transformed signal; and
    estimating, based on the channel characteristics, a plurality of ISI (Inter Symbol Interference) amounts that are each an amount of ISI occurring if the Fourier transform is performed in corresponding one of FFT window position candidates, and designating, as the FFT window position, one of the plurality of FFT window position candidates that corresponds to the smallest estimated ISI amount.

12. An integrated circuit for receiving an OFDM (Orthogonal Frequency Division Multiplexing) signal, comprising:
    a Fourier transform unit operable to perform Fourier transform on the received OFDM signal on a symbol-by-symbol basis in a designated FFT (Fast Fourier Transform) window position, so as to obtain a transformed signal;
    a channel characteristic estimation unit operable to estimate channel characteristics based on the transformed signal; and
    a window position control unit operable to estimate, based on the channel characteristics, a plurality of ISI (Inter Symbol Interference) amounts that are each an amount of ISI occurring if the Fourier transform is performed in a corresponding one of FFT window position candidates, and designate, as the FFT window position, one of the plurality of FFT window position candidates that corresponds to a smallest estimated ISI amount.

13. A digital television for displaying an image according to a signal obtained by receiving and demodulating an OFDM (Orthogonal Frequency Division Multiplexing) signal, comprising:
    a Fourier transform unit operable to perform Fourier transform on the received OFDM signal on a symbol-by-symbol basis in a designated FFT (Fast Fourier Transform) window position, so as to obtain a transformed signal;
    a channel characteristic estimation unit operable to estimate channel characteristics based on the transformed signal; and
    a window position control unit operable to estimate, based on the channel characteristics, a plurality of ISI (Inter Symbol Interference) amounts, that are each an amount of ISI occurring if the Fourier transform is performed in a corresponding one of FFT window position candidates, and to designate, as the FFT window position, one of the plurality of FFT window position candidates that corresponds to a smallest estimated ISI amount.

* * * * *